United States Patent
Cho et al.

(10) Patent No.: US 9,697,515 B2
(45) Date of Patent: Jul. 4, 2017

(54) MOBILE TERMINAL AND METHOD OF PERFORMING NFC PAYMENT USING THE MOBILE TERMINAL

(71) Applicant: LG ELECTRONICS INC., Seoul (KR)

(72) Inventors: Kyoungmin Cho, Seoul (KR); Ayoung Hyung, Seoul (KR); Hyonmi Choi, Seoul (KR); Yunju Jeon, Seoul (KR)

(73) Assignee: LG ELECTRONICS INC., Seoul (KR)

(*) Notice: Subject to any disclaimer, the term of this patent is extended or adjusted under 35 U.S.C. 154(b) by 31 days.

(21) Appl. No.: 13/947,956

(22) Filed: Jul. 22, 2013

(65) Prior Publication Data
US 2014/0040120 A1    Feb. 6, 2014

(30) Foreign Application Priority Data
Aug. 3, 2012  (KR) .................. 10-2012-0085374

(51) Int. Cl.
*G06Q 20/32* (2012.01)
*H04W 52/02* (2009.01)

(52) U.S. Cl.
CPC .... *G06Q 20/3278* (2013.01); *H04W 52/0261* (2013.01); *H04M 2250/04* (2013.01)

(58) Field of Classification Search
CPC  G06Q 20/3278; G06Q 20/3223; G06F 1/126; G06F 1/3203; G06F 1/3206
USPC ..................................... 705/39, 44
See application file for complete search history.

(56) References Cited

U.S. PATENT DOCUMENTS

| | | | |
|---|---|---|---|
| 8,763,112 B2 * | 6/2014 | Prakash | ......... G06F 21/31 713/186 |
| 2008/0078831 A1 | 4/2008 | Johnson et al. | |
| 2012/0124354 A1 | 5/2012 | Batwara et al. | |

(Continued)

FOREIGN PATENT DOCUMENTS

| | | |
|---|---|---|
| WO | 2007/127188 | 11/2007 |
| WO | 2010/111002 | 9/2010 |

OTHER PUBLICATIONS

European Patent Office Application Serial No. 13003794.8, Search Report dated Nov. 29, 2013, 5 pages.

(Continued)

*Primary Examiner* — Richard C. Weisberger
(74) *Attorney, Agent, or Firm* — Lee Hong Degerman Kang & Waimey

(57) ABSTRACT

Provided is a mobile terminal that has a function of changing a payment credit card at the time of near field communication (NFC) payment in a low battery state, and a method of performing the NFC payment using the mobile terminal. In the mobile terminal according to the present invention, unlike in a mobile terminal in the related art in which payment is simply performed with a default credit card, if the NFC payment is requested in the low battery state where the mobile terminal is powered off, a payment application based on a light operating system, which is executed on an embedded Linux, is displayed, and the NFC payment with a credit card selected from the payment application based on the corresponding light operating system is performed. Therefore, a credit card payment can be effectively performed in a low battery state as well.

18 Claims, 13 Drawing Sheets

(56) References Cited

U.S. PATENT DOCUMENTS

2013/0007873 A1* 1/2013 Prakash .................. G06F 21/31
726/18
2013/0054417 A1* 2/2013 O'Donoghue et al. .... 705/26.43
2014/0304094 A1* 10/2014 Reddy et al. .................. 705/17

OTHER PUBLICATIONS

European Patent Office Application Serial No. 13003794.8, Office Action dated May 30, 2016, 5 pages.

* cited by examiner

MOBILE TERMINAL AND METHOD OF PERFORMING NFC PAYMENT USING THE MOBILE TERMINAL

CROSS-REFERENCE TO RELATED APPLICATION

Pursuant to 35 U.S.C. §119(a), this application claims the benefit of earlier filing date and right of priority to Korean Application No. 10-2012-0085374, filed on Aug. 3, 2012, the contents of which is incorporated by reference herein in its entirety.

BACKGROUND OF THE DISCLOSURE

1. Field of the Disclosure

The present invention relates to a mobile terminal that has a function of changing a payment credit card at the time of near field communication (NFC) at a low battery state to improve convenience in credit card payment and a method of performing NFC payment using the mobile terminal.

2. Background of the Disclosure

A mobile terminal may be configured to perform various functions. The examples of the various functions may include a data and voice communication function, a photo or video capture function through a camera, a voice storage function, a music file reproduction function through a speaker system, an image or video display function, and the like. Some mobile terminals may include an additional function capable of implementing games, and some other mobile terminal may be implemented as a multimedia player. Moreover, recent mobile terminals receive broadcast or multicast signals to allow the user to view video or television programs. Furthermore, the efforts for supporting and enhancing the functions of the mobile terminal have been carried out. The foregoing efforts may include adding and improving software or hardware as well as changing and improving structural elements constituting a mobile terminal. A touch function of the mobile terminal is configured to allow a user who is not accustomed to input buttons or keys, to operate the mobile terminal conveniently. Recently, such touch function serves as an important function of the mobile terminal together with a user interface (UI) as well as a simple input.

Generally, near field communication is contactless-type short-range wireless communication that operates at a frequency bandwidth of 13.56 MHz. The NFC is a technology that requires a short distance of approximately 10 cm to transmit data between terminals equipped with an NFC chip.

The NFC is excellent in proximity, bi-directionality, and security, compared to other communication technologies, and has an advantage of establishing two way communication between the terminals in 1/10 second or less without requiring complex pairing. This allows the NFC to be in wide use in applications involving not only credit card payment and electronic ticker smart card, but also travel information transmission, traffic control, entrance and exit control, and locking mechanism.

Various functions through the use of the NFC are performed in a power off state of the mobile terminal. As one example, when the NFC payment is performed in the power off state, the mobile terminal provides a function of performing authentication processing and then allowing a user to select a credit card that he/she wants to use (to change a payment credit card).

However, because, in the related art, a separate function of changing a payment credit card is not performed at the time of the NF payment in the power off state, the user has to make the payment only with a default credit card. As a result, if, because an amount of charge money on the default credit card is all spent or an error takes place in the default credit card, the payment cannot be made with the default credit card, the user inconveniently has to set the payment card himself by going through separate setting processing.

SUMMARY OF THE DISCLOSURE

Therefore, an aspect of the detailed description is to provide a mobile terminal that has a function of selecting a payment credit card at the time of NFC payment in a power off state of the mobile terminal and a method of performing the NFC payment using the mobile terminal.

Another aspect of the detailed description is to provide a mobile terminal that has a function of changing a default credit card at the time of NFC payment in a power off state of the mobile terminal and a method of performing the NFC payment using the mobile terminal.

To achieve these and other advantages and in accordance with the purpose of this specification, as embodied and broadly described herein, there is provided a method of performing near field communication (NFC) payment using a mobile terminal, including receiving a payment request signal, checking whether the mobile terminal is in a power on state or in a power off state, displaying a mobile payment application, of which an operating system differs depending on the checked power source state of the mobile terminal, and performing the NFC payment with a credit card selected from the corresponding mobile payment application.

In the method of performing near field communication (NFC) payment using a mobile terminal, the displaying of the mobile payment application may include displaying the payment application based on a general operating system (OS), which is executed on a current operating system, if the mobile terminal is in the power on state, and displaying the payment application based on a light operating system, which is executed on an embedded Linux, if the mobile terminal is in the power off state.

In the method of performing NFC payment using a mobile terminal, the power off state may be a low battery state where the mobile terminal is difficult to operate normally, and the payment application based on the light operating system may be displayed only if an amount of available battery power is a threshold value or above.

The method of performing NFC payment using a mobile terminal may further include displaying again the same mobile payment application if the NFC payment with the selected credit card fails.

The method of performing NFC payment using a mobile terminal may further include performing the NFC payment with a default credit card if the NFC payment with the selected credit card fails.

To achieve these and other advantages and in accordance with the purpose of this specification, as embodied and broadly described herein, there is provided a method of performing near field communication (NFC) payment using a mobile terminal, including receiving a payment request signal, checking whether the mobile terminal is in a power on state or in a power off state, displaying a payment application based on a general operating system, which is executed on a current operating system, if the mobile terminal is in the power on state, and displaying selectively a payment application based on a light operating system (for example, Linux), depending on a user payment setting, and performing the NFC payment, if the mobile terminal is in the power off state.

In the method of performing NFC payment using a mobile terminal, the power off state may be a low battery state where the mobile terminal is difficult to operate normally, and the payment setting may include a credit card setting for the NFC payment and one more payment.

In the method of performing NFC payment using a mobile terminal, the performing of the NFC payment depending on the payment setting may include displaying the payment application based on a light operating system, for selection of a credit card, if the payment that is set is application payment, and performing the payment with a default credit card if the payment that is set is default payment.

The method of performing NFC payment using a mobile terminal may further include performing the one more payment depending on the payment setting, if the NFC payment fails.

In the method of performing NFC payment using a mobile terminal, if the NFC payment is performed with the default credit card depending on the payment setting, the one more payment is performed with the credit card selected from the payment application.

In the method of performing NFC payment using a mobile terminal, if the NFC payment is performed with the credit card selected from the payment application, depending on the payment setting, the one more payment may be performed with a different credit card selected from the payment application.

In the method of performing NFC payment using a mobile terminal, if the NFC payment is performed with the credit card selected from the payment application, depending on the payment setting, the one more payment may be performed with a default credit card.

To achieve these and other advantages and in accordance with the purpose of this specification, as embodied and broadly described herein, there is provided a mobile terminal including a display unit, a universal IC card (UICC) that stores payment credit card information, and a near field communication (NFC) chip that, when receiving a payment request signal, displays a mobile payment application, of which an operating system (OS) differs depending on whether the mobile terminal is in a power on state or in a power off state, and performs payment with a credit card selected from the mobile payment application.

In the mobile terminal, if the mobile terminal is in the power on state, the NFC chip may display a payment application that is executed on a current operating system (OS), and if the mobile terminal is in the power off state, may display a payment application that is executed on a light operating system (for example, an embedded Linux).

In the mobile terminal, the power off state may be a low battery state where the mobile terminal is difficult to operate normally.

In the mobile terminal, if an amount of available battery power is a threshold value or above, the NFC chip may display the payment application based on the light operating system (for example, Linux).

In the mobile terminal, if the NFC payment with the selected credit card fails, the NFC chip may display again the same mobile payment application and may perform one more payment with the credit card selected from the mobile payment application.

In the mobile terminal, if the NFC payment with the selected credit card fails, the NFC chip may perform the one more payment with a default credit card stored in a universal IC (UICC).

To achieve these and other advantages and in accordance with the purpose of this specification, as embodied and broadly described herein, there is provided a mobile terminal including a display unit, a universal IC card (UICC) that stores payment credit card information, and a near field communication (NFC) that, if a payment request signal is received in a power off state of the mobile terminal, selectively displays a payment application based on a light operating system (for example, an embedded Linux), depending on a user payment setting and performs payment with a credit card selected from the corresponding application.

In the mobile terminal, if the payment request signal is received in a power on state of the mobile terminal, the NFC chip displays the payment application based on a current operating system (OS).

In the mobile terminal, the power off state may be a low battery state and the payment setting may include a credit card setting for NFC payment and one more payment.

In the mobile terminal, if the payment that is set is application payment, the NFC chip may perform the payment application based on the light operating system, for selection of a credit card and if the payment that is set is default payment, may perform the payment with a default credit card.

In the mobile terminal, if the NFC credit card payment fails, the NFC chip may perform one more payment.

In the mobile terminal, if the NFC payment is made with a default credit card depending on the payment setting, the one more payment may be performed with a credit card selected from the payment application.

In the mobile terminal, if the NFC payment is made with the credit card selected from the payment application, depending on the payment setting, the one more payment may be performed with another credit card selected from the payment application.

In the mobile terminal, if the NFC payment is made with the credit card selected from the payment application, depending on the payment setting, the one more payment is performed with the default credit card.

Further scope of applicability of the present application will become more apparent from the detailed description given hereinafter. However, it should be understood that the detailed description and specific examples, while indicating preferred embodiments of the disclosure, are given by way of illustration only, since various changes and modifications within the spirit and scope of the disclosure will become apparent to those skilled in the art from the detailed description.

BRIEF DESCRIPTION OF THE DRAWINGS

The accompanying drawings, which are included to provide a further understanding of the disclosure and are incorporated in and constitute a part of this specification, illustrate exemplary embodiments and together with the description serve to explain the principles of the disclosure.

In the drawings.

DETAILED DESCRIPTION OF THE DISCLOSURE

Description will now be given in detail of preferred configurations of mobile terminals according to the present invention, with reference to the accompanying drawings. Hereinafter, suffixes "module" and "unit or portion" for components used herein in description are merely provided only for facilitation of preparing this specification, and thus they are not granted a specific meaning or function. Hence, it should be noticed that "module" and "unit or portion" can be used together.

Mobile terminals may be implemented using a variety of different types of terminals. Examples of such terminals include mobile terminals, such as mobile phones, smart phones, notebook computers, digital broadcast terminals, Personal Digital Assistants (PDA), Portable Multimedia Players (PMP), navigators and the like, and stationary terminals, such as digital TVs, desktop computers and the like. The following description assumes that the terminal is a mobile terminal. However, it can be easily understood by those skilled in the art that the configuration according to the following description can be applied to the stationary terminals except for components particularly provided for mobility.

Figure 1:
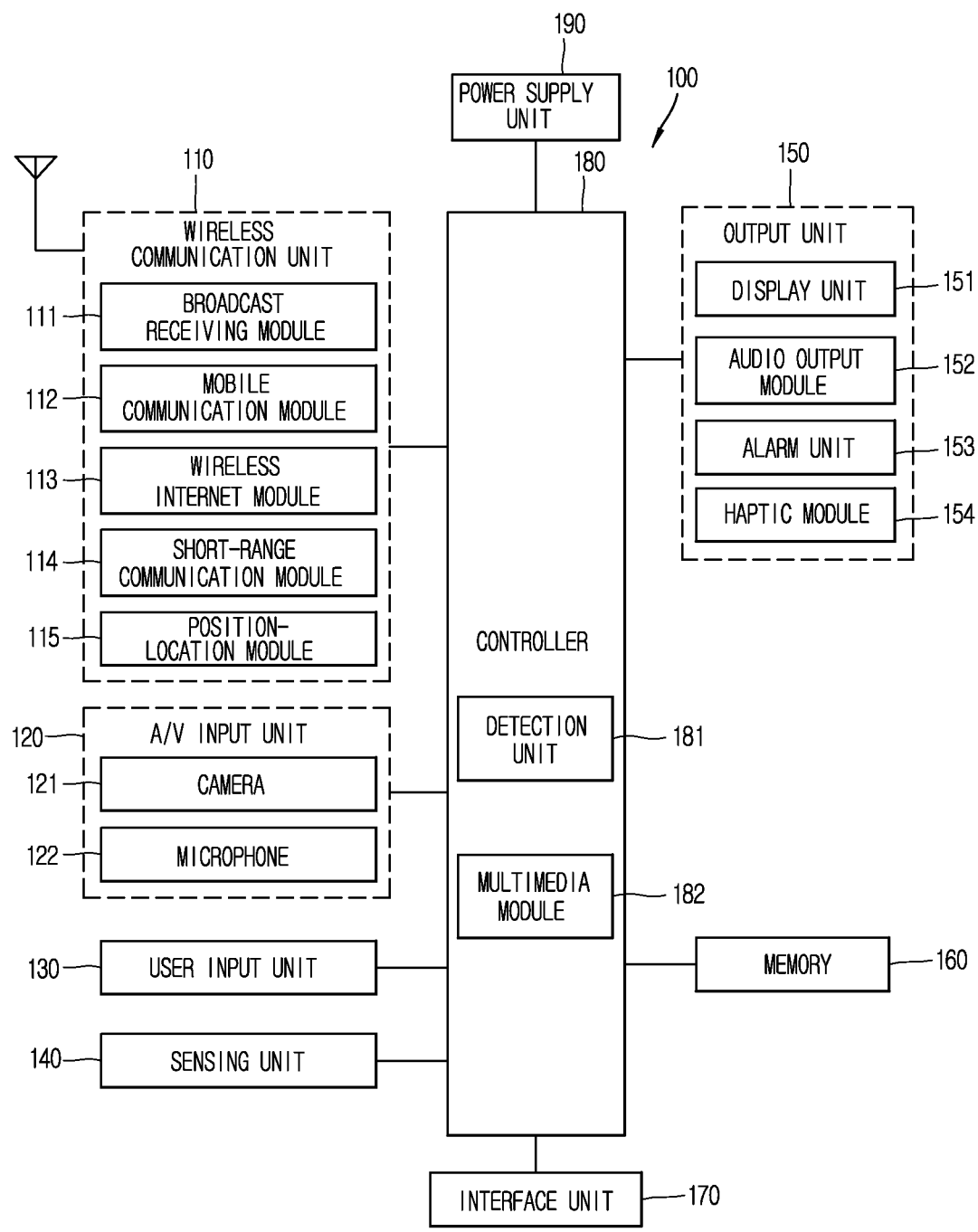
FIG. 1 is a block diagram illustrating a mobile terminal according to one embodiment of the present invention.

FIG. 1 is a block diagram of a mobile terminal in accordance with one embodiment of the present invention.

The mobile terminal 100 may comprise components, such as a wireless communication unit 110, an Audio/Video (A/V) input unit 120, a user input unit 130, a sensing unit 140, an output unit 150, a memory 160, an interface unit 170, a controller 180, a power supply 190 and the like. FIG. 1 shows the mobile terminal 100 having various components, but it is understood that implementing all of the illustrated components is not a requirement. Greater or fewer components may alternatively be implemented.

Hereinafter, each component is described in sequence.

The wireless communication unit 110 may typically include one or more components which permit wireless communications between the mobile terminal 100 and a wireless communication system or between the mobile terminal 100 and a network within which the mobile terminal 100 is located. For example, the wireless communication unit 110 may include a broadcast receiving module 111, a mobile communication module 112, a wireless internet module 113, a short-range communication module 114, a position location module 115 and the like.

The broadcast receiving module 111 receives a broadcast signal and/or broadcast associated information from an external broadcast managing entity via a broadcast channel. Examples of broadcast associated information may include information associated with a broadcast channel, a broadcast program, a broadcast service provider, and the like. The broadcast signal may be implemented as a TV broadcast signal, a radio broadcast signal, and a data broadcast signal, among others. The broadcast signal may further include a data broadcast signal combined with a TV or radio broadcast signal.

The broadcast associated information may be provided via a mobile communication network, and received by the mobile communication module 112.

The broadcast associated information may be implemented in various formats. For instance, broadcast associated information may include Electronic Program Guide (EPG) of Digital Multimedia Broadcasting (DMB), Electronic Service Guide (ESG) of Digital Video Broadcast-Handheld (DVB-H), and the like.

The broadcast receiving module 111 may be configured to receive digital broadcast signals transmitted from various types of broadcast systems. Such broadcast systems may include Digital Multimedia Broadcasting-Terrestrial (DMB-T), Digital Multimedia Broadcasting-Satellite (DMB-S), Media Forward Link Only (MediaFLO), Digital Video Broadcast-Handheld (DVB-H), Integrated Services Digital Broadcast-Terrestrial (ISDB-T), and the like. The broadcast receiving module 111 may be configured to be suitable for every broadcast system transmitting broadcast signals as well as the digital broadcasting systems.

Broadcast signals and/or broadcast associated information received via the broadcast receiving module 111 may be stored in a suitable device, such as a memory 160.

The mobile communication module 112 transmits/receives wireless signals to/from at least one of network entities (e.g., base station, an external mobile terminal, a server, etc.) on a mobile communication network. Here, the wireless signals may include audio call signal, video call signal, or various formats of data according to transmission/reception of text/multimedia messages.

The wireless internet module 113 supports wireless Internet access for the mobile terminal. This module may be internally or externally coupled to the mobile terminal. Examples of such wireless Internet access may include Wireless LAN (WLAN), Wi-Fi, Wireless Broadband (Wibro), World Interoperability for Microwave Access (Wimax), High Speed Downlink Packet Access (HSDPA), and the like.

The short-range communication module 114 denotes a module for short-range communications. Suitable technologies for implementing this module may include BLUETOOTH, Radio Frequency IDentification (RFID), Infrared Data Association (IrDA), Ultra-WideBand (UWB), ZigBee, Near Field Communication (NFC) and the like. Short-range communication related modules for user account, in addition to those short-range communication modules, may employ a method proposed in the present disclosure.

The position location module 115 denotes a module for detecting or calculating a position of a mobile terminal. An example of the position location module 115 may include a Global Position System (GPS) module. Under the current technique, the GPS module can measure accurate time and distance respectively from more than three satellites so as to accurately calculate a current position of the mobile terminal based on such three different distances according to a triangulation scheme. A scheme may be used to obtain time information and distance information from three satellites and correct error by one satellite. Also, the GPS module may continuously calculate a current position in real time so as to obtain speed information.

The A/V input unit 120 is configured to provide audio or video signal input to the mobile terminal. The A/V input unit 120 may include a camera 121 and a microphone 122. The camera 121 receives and processes image frames of still pictures or video obtained by image sensors in a video call mode or a capturing mode. The processed image frames may be displayed on a display 151.

The image frames processed by the camera 121 may be stored in the memory 160 or transmitted to the exterior via the wireless communication unit 110. Two or more cameras 121 may be provided according to the configuration of the mobile terminal.

The microphone 122 may receive an external audio signal via a microphone while the mobile terminal is in a particular mode, such as a phone call mode, a recording mode, a voice recognition mode, or the like. This audio signal is processed into digital data. The processed digital data is converted for output into a format transmittable to a mobile communication base station via the mobile communication module 112 in case of the phone call mode. The microphone 122 may include assorted noise removing algorithms to remove noise generated in the course of receiving the external audio signal.

The user input unit 130 may generate input data inputted by a user to control the operation of the mobile terminal. The user input unit 130 may include a keypad, a dome switch, a touchpad (e.g., static pressure/capacitance), a jog wheel, a jog switch and the like. A specific example can be one in which the touchpad is layered with the display 151 to be explained later so as to be in cooperation with the display 151, which is referred to as a touch screen.

The sensing unit 140 provides status measurements of various aspects of the mobile terminal. For instance, the sensing unit 140 may detect an open/close status of the mobile terminal, a change in a location of the mobile terminal 100, a presence or absence of user contact with the mobile terminal 100, the location of the mobile terminal 100, acceleration/deceleration of the mobile terminal 100, and the like, so as to generate a sensing signal for controlling the operation of the mobile terminal 100. For example, regarding a slide-type mobile terminal, the sensing unit 140 may sense whether a sliding portion of the mobile terminal is open or closed. Other examples include sensing functions, such as the sensing unit 140 sensing the presence or absence of power provided by the power supply 190, the presence or absence of a coupling or other connection between the interface unit 170 and an external device, and the like. Here, the sensing unit 140 may include a proximity sensor 141, which will be described later in relation to a touch screen.

The sensing unit 140 includes a geomagnetic sensor to calculate a moving direction when a user moves, a gyro sensor to calculate a rotating direction, and an acceleration sensor.

The interface unit 170 is generally implemented to couple the mobile terminal to external devices. The interface unit 170 may include, for example, wired/wireless headset ports, external charger ports, wired/wireless data ports, memory card ports, ports for coupling devices having an identification module, etc.), audio Input/Output (I/O) ports, video I/O ports, earphone ports, and the like.

The identification module may be configured as a chip for storing various information required to authenticate an authority to use the mobile terminal 100, which may include a User Identity Module (UIM), a Subscriber Identity Module (SIM), a Universal Subscriber Identity Module (USIM), and the like. Also, the device having the identification module (hereinafter, referred to as 'identification device') may be implemented in a type of smart card. Hence, the identification device can be coupled to the mobile terminal 100 via a port. Such interface unit 170 may receive data from an external device, or provided with power and accordingly transfer the received data or power to each component within the mobile terminal 100 or transfer data of the mobile terminal 100 to an external device.

Also, the interface unit 170 may serve as a path for power to be supplied from an external cradle to the mobile terminal 100 when the mobile terminal 100 is connected to the external cradle or as a path for transferring various command signals inputted from the cradle by a user to the mobile terminal 100. Such various command signals or power inputted from the cradle may operate as signals for recognizing that the mobile terminal 100 has accurately been mounted to the cradle.

The output unit 150 is configured to output an audio signal, a video signal or an alarm signal. The output unit 150 may include a display 151, an audio output module 152, an alarm 153, and the like.

The display 151 may output information processed in the mobile terminal 100. For example, when the mobile terminal is operating in a phone call mode, the display 151 will provide a User Interface (UI) or a Graphic User Interface (GUI) which includes information associated with the call.

Meanwhile, as mentioned above, a touch screen can be configured as the display 151 and the touchpad are layered with each other to work in cooperation with each other. This configuration permits the display 151 to function both as an input device and as an output device. The display 151 may be implemented using, for example, a Liquid Crystal Display (LCD), a Thin Film Transistor-Liquid Crystal Display (TFT-LCD), an Organic Light-Emitting Diode (OLED), a flexible display, a three-dimensional (3D) display, or the like. Some of the displays can be configured to be transparent such that it is possible to see the exterior therethrough. These displays may be called transparent displays. A representative example of the transparent display may include a Transparent Organic Light Emitting Diode (TOLED), and the like. The mobile terminal 100 may include two or more of such displays 151 according to its embodiment. For example, the mobile terminal 100 may simultaneously include an external display (not shown) and an internal display (not shown). The touch screen may be configured so as to detect a touch input pressure as well as touch input position and touch input area.

The audio output module 152 may output audio data which is received from the wireless communication unit 110 in various modes including call-receiving mode, call-placing mode, recording mode, voice recognition mode, broadcast reception mode, and the like, or audio data stored in the memory 160. Also, the audio output module 152 may output an audio signal relating to a particular function (e.g., call received, message received, etc.) performed in the mobile terminal 100. The audio output module 152 may be implemented using a speaker, a buzzer, or the like.

The alarm unit 153 outputs signals notifying occurrence of events from the mobile terminal 100. The events occurring from the mobile terminal 100 may include call received, message received, key signal input, touch input, and so on. The alarm unit 153 may output not only video or audio signals, but also other types of signals such as signals notifying occurrence of events in a vibration manner. When a call signal or a message is received, the alarm unit 153 may output vibration to make a user recognize the event occurrence. Of course, the signal for notifying the event occurrence may be output through the display unit 151 or the audio output module 152.

The memory 160 may store a program for the processing and control of the controller 180. Alternatively, the memory 160 may temporarily store input/output data (e.g., phonebook data, messages, still images, video and the like). Also, the memory 160 may store data related to various patterns of vibrations and audio output upon the touch input on the touch screen.

The memory 160 may be implemented using any type of suitable storage medium including a flash memory type, a hard disk type, a multimedia card micro type, a memory card type (e.g., SD or DX memory), Random Access Memory (RAM), Static Random Access Memory (SRAM), Read-Only Memory (ROM), Electrically Erasable Programmable Read-only Memory (EEPROM), Programmable Read-only Memory (PROM), magnetic memory, magnetic disk, optical disk, and the like. Also, the mobile terminal 100 may operate a web storage which performs the storage function of the memory 160 on the Internet.

The controller 180 typically controls the overall operations of the mobile terminal 100. For example, the controller 180 performs the control and processing associated with telephony calls, data communications, video calls, and the like. The controller 180 may include a multimedia module 181 which provides multimedia playback. The multimedia module 181 may be configured as part of the controller 180 or as a separate component.

The controller 180 can perform a pattern recognition processing so as to recognize writing or drawing input on the touch screen as text or image.

The power supply 190 provides power required by various components under the control of the controller 180. The provided power may be internal power, external power, or combination thereof.

Various embodiments described herein may be implemented in a computer-readable medium using, for example, software, hardware, or some combination thereof.

For a hardware implementation, the embodiments described herein may be implemented within one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, microprocessors, other electronic units designed to perform the functions described herein, or a selective combination thereof. In some cases, such embodiments are implemented by the controller 180.

For software implementation, the embodiments such as procedures and functions may be implemented together with separate software modules each of which performs at least one of functions and operations. The software codes can be implemented with a software application written in any suitable programming language. Also, the software codes may be stored in the memory 160 and executed by the controller 180.

The mobile terminal 100 shown in FIG. 1 may be configured to operate within a communication system which transmits data via frames or packets, including both wireless and wireline communication systems, and satellite-based communication systems.

Figure 2:
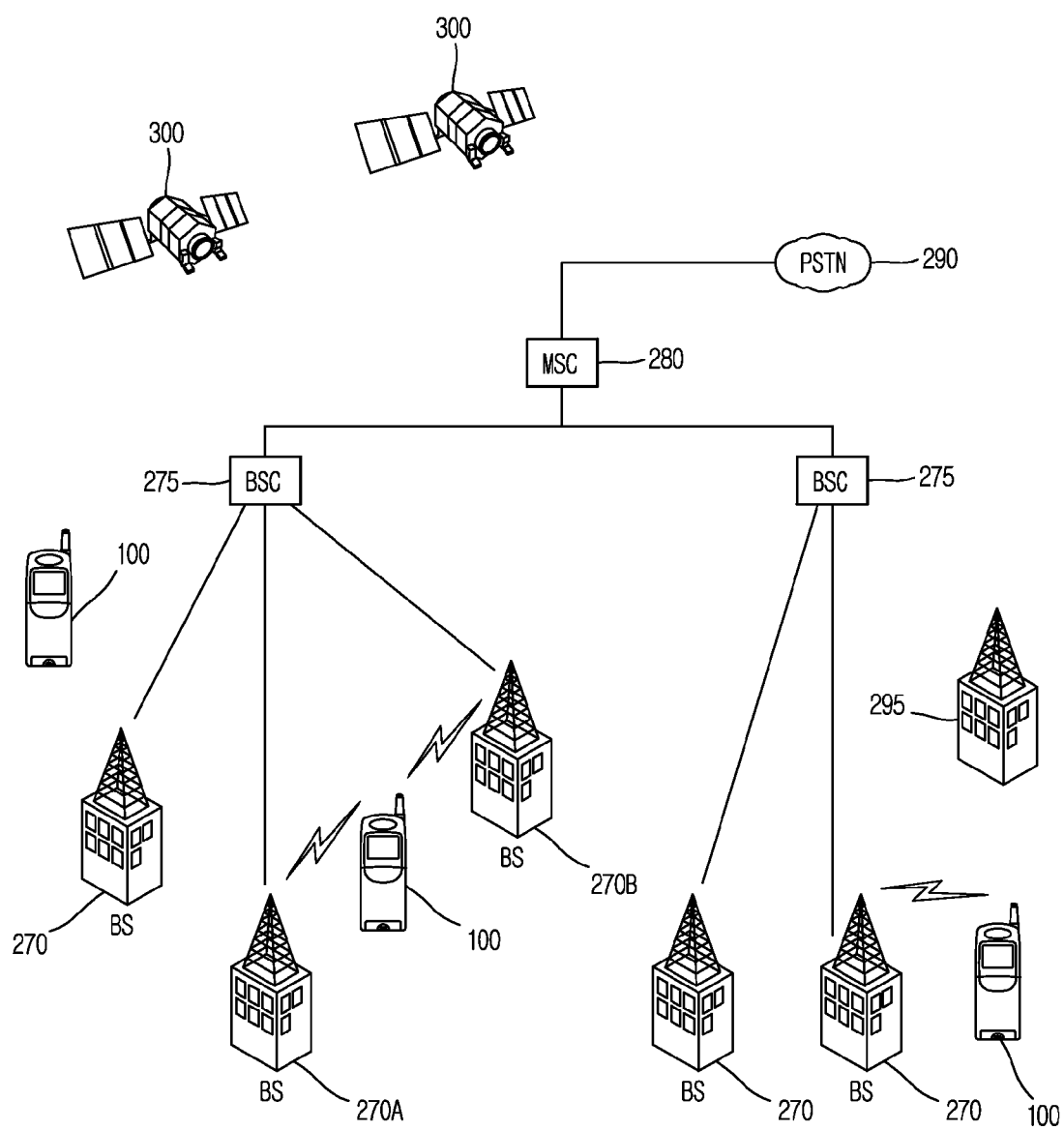
FIG. 2 is a block diagram illustrating a wireless communication system in which the mobile terminal according to one embodiment of the present invention.

FIG. 2 shows a wireless communication system which is operable with the mobile terminal in accordance with the one embodiment.

As shown in FIG. 2, a wireless communication system is shown having a plurality of mobile terminals 100, a plurality of base stations (BSs) 270, base station controllers (BSCs) 275, and a mobile switching center (MSC) 280. The MSC 280 is configured to interface with a conventional Public Switch Telephone Network (PSTN) 290. The MSC 280 is also configured to interface with the BSCs 275. The BSCs 275 are coupled to the base stations 270 via backhaul lines. The backhaul lines may be configured in accordance with any of several known interfaces including, for example, E1/T1, ATM, IP, PPP, Frame Relay, HDSL, ADSL, or xDSL. Hence, the plurality of BSCs 275 can be included in the system as shown in FIG. 2.

Each base station 270 may include one or more sectors, each sector having an omni-directional antenna or an antenna pointed in a particular direction radially away from the base station 270. Alternatively, each sector may include two or more different antennas. Each base station 270 may be configured to support a plurality of frequency assignments, with each frequency assignment having a particular spectrum (e.g., 1.25 MHz, 5 MHz, etc.).

The intersection of sector and frequency assignment may be referred to as a CDMA channel. The base stations 270 may also be referred to as Base Station Transceiver Subsystems (BTSs). In some cases, the term "base station" may be used to refer collectively to a BSC 275, and one or more base stations 270. The base stations may also be denoted as "cell sites." Alternatively, individual sectors of a given base station 270 may be referred to as cell sites.

A broadcasting transmitter (BT) 295, as shown in FIG. 2, transmits a broadcast signal to the mobile terminals 100 operating within the system. The broadcast receiving module 111 (FIG. 1) is typically configured inside the mobile terminal 100 to receive broadcast signals transmitted by the BT 295.

FIG. 2 further depicts several Global Positioning System (GPS) satellites 300. Such satellites 300 facilitate locating the position of at least one of plural mobile terminals 100. Two satellites are depicted in FIG. 2, but it is understood that useful position information may be obtained with greater or fewer satellites than two satellites. The GPS module 115 (FIG. 1) is typically configured to cooperate with the satellites 300 to obtain desired position information. It is to be appreciated that other types of position detection technology, (i.e., location technology that may be used in addition to or instead of GPS location technology) may alternatively be implemented. If desired, at least one of the GPS satellites 300 may alternatively or additionally be configured to provide satellite DMB transmissions.

During typical operation of the wireless communication system, the base stations 270 receive sets of reverse-link signals from various mobile terminals 100. The mobile terminals 100 are engaging in calls, messaging, and executing other communications. Each reverse-link signal received by a given base station 270 is processed within that base station 270. The resulting data is forwarded to an associated BSC 275. The BSC 275 provides call resource allocation and mobility management functionality including the orchestration of soft handoffs between base stations 270. The BSCs 275 also route the received data to the MSC 280, which then provides additional routing services for interfacing with the PSTN 290. Similarly, the PSTN 290 interfaces with the MSC 280, and the MSC 280 interfaces with the BSCs 275, which in turn control the base stations 270 to transmit sets of forward-link signals to the mobile terminals 100.

According to the present invention, a power off state of the mobile terminal 100 means a low battery state, that is, a state where the mobile terminal 100 is automatically powered off, not a state where the mobile terminal 100 is voluntarily turned off by a user. In particular, the low battery state means a state where an amount of available battery power is not sufficient to keep all functions performed to perform general functions of the mobile terminal 100, that is, a state where the amount of available battery power is such that only specific functions can be performed on a light operating system. This means that the amount of available battery power is not zero, and that if the mobile terminal 100 is forced to be powered on and is returned to normal operation, the mobile terminal 100 is automatically turned off.

Generally, if a battery voltage is 2.7 V or more, NFC payment (credit card emulation) is available. It is known that although the mobile terminal 100 is in the low battery state, the NFC payment can be performed 20 to 30 times. A minimum state of battery power for the NFC payment is approximately 17 mA as the low battery state. A minimum amount of battery power necessary for one NFC payment is approximately 5 mA on average.

In addition, the amount of battery power necessary for APDU communication between the mobile terminal 100 and a POS terminal 200 that is established for selection of a credit card at the time of the NFC payment is a maximum of 50 mA prescribed in the specification, but this value is an amount of battery power that is necessary when the NFC payments are continuously performed and therefore is not an exact value. In particular, because when performing the NFC payment in the low battery state, the APDU communication has been established between the mobile terminal 100 and the POS terminal 200, the communication with an application in the low battery state is sufficiently possible.

Therefore, in the low battery state where the mobile terminal 100 is powered off state, the application (AP) (hereinafter referred to as a light application) in which to change a default credit card can be displayed and the credit card can be selected. That is, because when the minimum state of battery power for the NFC payment is defined as 17 mA, the corresponding amount of battery power is the amount of battery power available to boot the mobile terminal 100, the APDU communication for displaying the light application (LA) according to the present invention, which is executed with low power consumption, and for selecting the credit card in the corresponding light application (LP) is sufficiently possible.

According to the present invention, a method is provided in which the default card is changed by using minimum electric power when performing the NFC payment in the low battery state where the mobile terminal 100 is powered off.

To do this, according to the present invention, a mobile payment application is provided that is executed on different operating systems, depending on whether the mobile terminal 100 is in the power on state or in the power off state.

In addition, according to the present invention, a method is provided in which if the NFC payment is performed with the default card in the low battery state where the mobile terminal 100 is powered off and then notification of a payment failure is received from a point of sale (POS), the default card is changed. To do this, according to the present invention, a setting of the various payment credit cards is provided.

The change of the default card is made through a mobile payment application that is automatically executed at the time of the NFC payment in the power off state. A credit card selection screen is displayed when executing the mobile payment application (AP).

The mobile payment application is a mobile wallet application that is based on the light operating system, for example, an embedded Linux. The mobile payment application that is based on the light operating system (for example, the Linux) is referred to as a light application in order to be distinguishable from a mobile payment application that is based on an existing general operating system (OS).

The embedded Linux is an operating system that is designed to perform the smaller number of functions than the general OS does. The embedded Linus is designed for the purpose of shortening booting time and performing only specific functions, and thus is lighter in program load than the general operating system. The light application is executed on the light operating system (for example, the embedded Linux). Accordingly, the advantage is that the light application is smaller in power consumption and is faster in speed (a booting process is not performed) than the mobile payment application that is executed on the existing operating system of the mobile terminal 100. That is, in the low battery state where the mobile terminal 100 is powered off, the mobile payment application cannot be displayed that is based on the general OS which is great in power consumption, and which takes predetermined time to be booted.

Therefore, according to the present invention, the effective NFC payment can be performed in the low battery state by executing the mobile payment application based on the light operating system (for example, Linux) that is small in power consumption and is fast in speed (the booting process is not performed or the short booting process is performed).

The mobile terminal 100 described above is a mobile terminal equipped with an NFC chip, and the POS described above is a POS system (hereinafter referred to as the POS terminal) as an NFC reader. The POS terminal performs functions of scanning commodities and displaying a payment amount and a receipt, and performs functions of authenticating a user (a terminal) and enabling a credit card payment.

Figure 3:
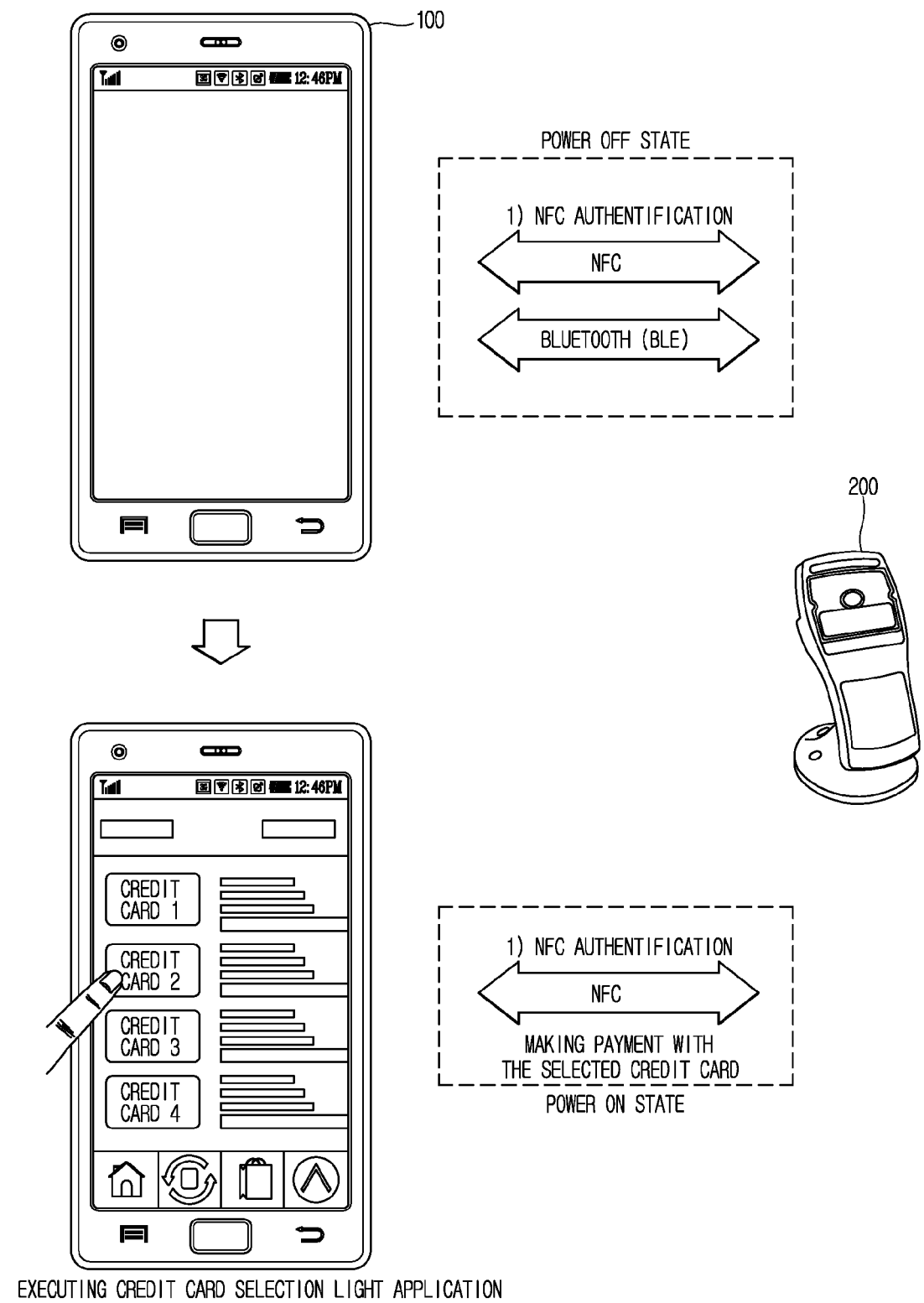
FIG. 3 is a diagram illustrating a method of performing NFC payment using the mobile terminal according to an embodiment of the present invention.

FIG. 3 is a diagram illustrating a method of performing the NFC payment using the mobile terminal 100 according to an embodiment of the present invention.

As illustrated in FIG. 3, when performing the NFC payment in the state where the mobile terminal 100 is powered off, the user makes the mobile terminal 100 bring into close proximity with the POS terminal 200. The close proximity of the two terminals 100 and 200 transfers user information stored in a universal IC card (UICC) of the mobile terminal 100 to the POS terminal 200, thereby performing NFC authentication (user authentication).

During the NFC authentication process, the POS terminal 200 transfers a Bluetooth signal to the mobile terminal 100 and boots the operating system (for example, the embedded Linux) of the mobile terminal 100. That is, the embedded Linux is booted by transferring the Bluetooth signal and the light application is executed, as in a Wake-on-Lan (WOL) technology that allows a computer to be turned on by using a specially-designed packet. The function described above is referred to as Bluetooth low energy (BLE) to be distinguishable from the Wake-on-Lan implementation. The Bluetooth signal is a payment request signal, as an NFC signal. In particular, the function described above is for the POS terminal 200 to boot the embedded Linux on the mobile terminal 100 by using the Bluetooth signal and execute the payment application on the embedded Linux by using the NFC technology when the NFC technology is not employed in the mobile phone 100 in such a manner that an NFC module powers on the mobile terminal 100.

However, if the NFC module is designed in such a manner that the NFC module itself applies electric power, boots the embedded Linux and executes the payment application, the Bluetooth signal does not need to be separately received. According to the present invention, a case where the Bluetooth signal is received is described as an example, for convenience in description.

If the light application is executed with the Bluetooth signal, the credit card selection screen is displayed on the display unit 151. If the user selects a specific payment credit card and an installment period from the credit card selection screen, information on the selected credit card is transmitted to the POS terminal 200. Therefore, the POS terminal 200 performs the credit card payment by transmitting the information selected by the user to an external POS server. If the credit card payment succeeds, the POS terminal 200 transmits payment success information to the mobile terminal 100, and if the credit card payment fails, the POS terminal 200 transmits payment failure information to the mobile terminal 100. The user checks payment information through the light application. If, as a result of the checking, it is determined that the credit card payment results in failure, the user selects another credit card and proceeds to perform the NFC payment.

According to the present invention, unlike in the mobile terminal 100 in the related art in which the payment is performed with the default credit card, if the mobile terminal 100 equipped with the NFC chip, which is in the power off state, is brought into close proximity with the POS terminal 200, the light application is executed in this manner, in order for the NFC payment to be performed with the credit card selected by the user.

Figure 4:
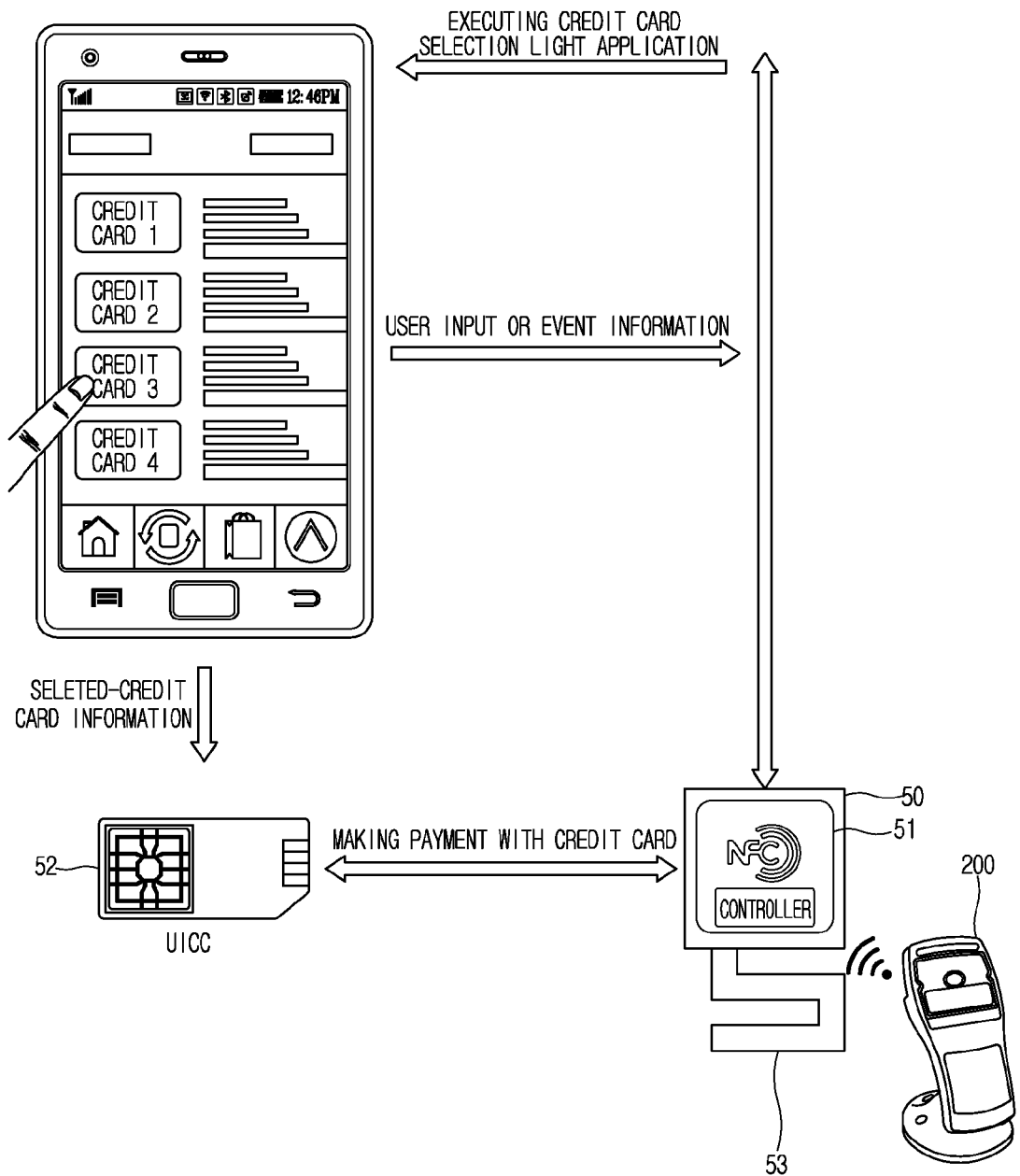
FIG. 4 is a diagram illustrating an example in which a light application for selecting a credit card that is displayed at the time of the NFC payment in a power off state.

FIG. 4 is a diagram illustrating an example in which the light application for selecting the credit card that is displayed at the time of the NFC payment in the power off state.

As illustrated in FIG. 4, if the mobile terminal 100 equipped with an NFC chip 50 is brought into close proximity with the POS terminal 200, the payment request signal is received by a controller 51 within the NFC chip 50.

If the controller 51 receiving the payment request signal checks a power source state of the mobile terminal 100 and finds that the mobile terminal 100 is in the power off state, the controller 51 does not perform the payment with the default credit card stored in the UICC 52. Then, the controller 51 checks the amount of available battery power and determines whether to perform the payment with a default credit card or whether to execute the light application according to the present invention.

That is, if the mobile terminal 100 is in the power off state, the controller 51 checks whether the amount of available battery power is a predetermined threshold value (for example, 10 mA) or above. The threshold value is a minimum amount of the battery power necessary for one NFC payment. If, as a result of checking, the amount of available battery power is less the threshold value (for example, 10 mA), the controller 51 performs the payment by using the default card stored in the UICC 52 in the same manner as is previously done, and if the amount of available battery power is the threshold value (for example, 10 mA) or above, the controller 51 boots the light operating system (for example, the embedded Linux) through the application processor (AP) within a tunnel and thus executes the light application on the display unit 151.

The selectable multiple credit cards and the corresponding installment period and option items appear on the light application, and thus the user can select the credit card that he/she wants to use, the installment period and others from the light application. At this time, the user can select at least one payment credit card in preparation for possible failure to perform the payment. If the user selects the multiple payment credit cards, the selected multiple credit cards are prioritized, and for example, the first credit card selected is set to the highest priority. Credit card information selected from the light application is stored in the UICC 52.

If the selection of the payment credit card by the user is completed, a payment module of the NFC chip 50 selected by the user reads the information on the payment credit card and transmits it the POS terminal 200 through an antenna 53 to request the credit card payment. If the requested credit card payment succeeds, the POS terminal 200 transmits the payment success information to the credit card payment module of the NFC chip 50, and if the requested credit card payment fails, the POS terminal 200 transmits the payment failure information to the credit card payment module of the NFC chip 50.

Therefore, because the received payment information appears on the light application through the controller 51, the user can check the payment information appearing on the light application. If, as a result of the checking, it is determined that the payment results in failure, the user may select another payment credit card, or may perform the NFC payment with the second highest priority. At this time, a message asking whether the user makes a payment with another payment credit card may be displayed.

If the payment with the default credit card succeeds, this operation does not take place. However, the operation may take place if the user provides a setting in such a manner that, in the event of a failure in the default credit card payment, the operation takes place. This means a situation where, when the user make a payment but without success, the POS terminal 200 notifies the user of the payment failure, and thus the user further has to bring the mobile terminal 100 bring into close proximity with the POS terminal 200 to make the payment. That is, this means the case where if the mobile terminal 100 is again brought into close proximity with the POS terminal 200 when predetermined time elapses after the mobile terminal 100 haven been brought into close proximity with the POS terminal 200, the payment is not made with the default credit card as it is previously done, but the light application is displayed for the selection of the card.

The operation described above is performed in the power on state as well. Specifically, when the mobile terminal 100 is brought into close proximity with the POS terminal 200 to make the first payment, the payment is performed in a state where a UI of the application for selecting the credit card is unseen, but because the POS terminal 200 notifies that the corresponding credit card payment fails, if after the predetermined time elapses, the mobile terminal 100 is brought into close proximity with the same POS terminal 200, the UI of the application for selecting the credit card is seen.

Figure 5:
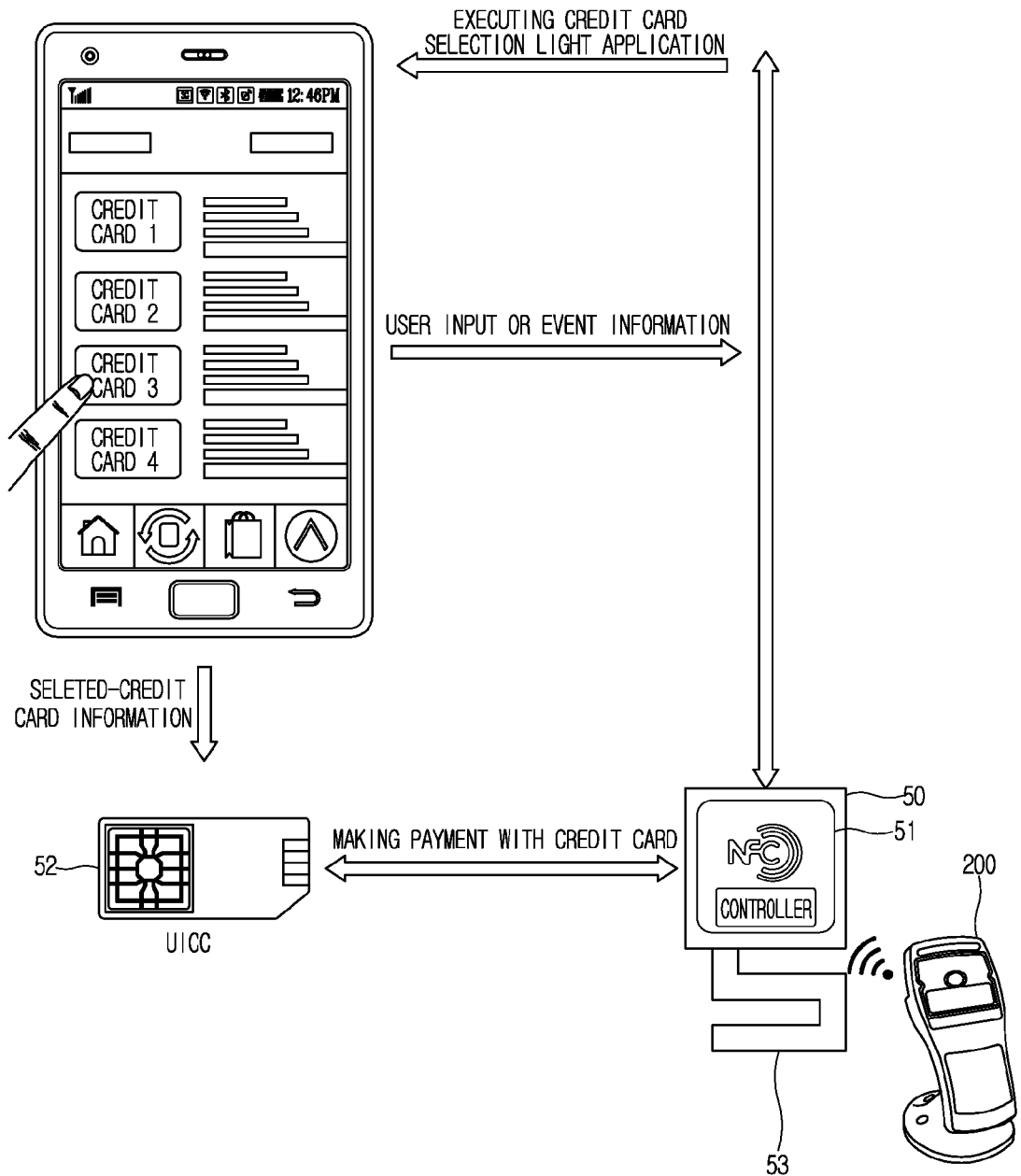
FIG. 5 is a diagram illustrating an example in which the light application for selecting the existing credit card is displayed at the time of the NFC payment in a power on state.

FIG. 5 is a diagram illustrating an example in which the light application for selecting the existing credit card is displayed at the time of the NFC payment in the power on state.

The operation in the case where the NFC payment is performed in the power on state is the same as in FIG. 4, except that the existing mobile wallet application is displayed on the display unit 151. That is, if, as a result of checking the power source state of the mobile 100 terminal, the mobile terminal 100 is in the power on state, the controller 51 boots the same operating system (OS) as it did previously and the mobile wallet application on the display unit 151 in order for the user to select the payment credit card.

In the NFC chip 50 described in FIG. 4 and FIG. 5, the controller 51 performs a function of checking the power source state (the power on state and the power off state) of the mobile terminal 100. However, if the controller 51 provides the function of checking the power source state, the power source state may be checked through a separate light application for checking the power source state.

Figure 6:
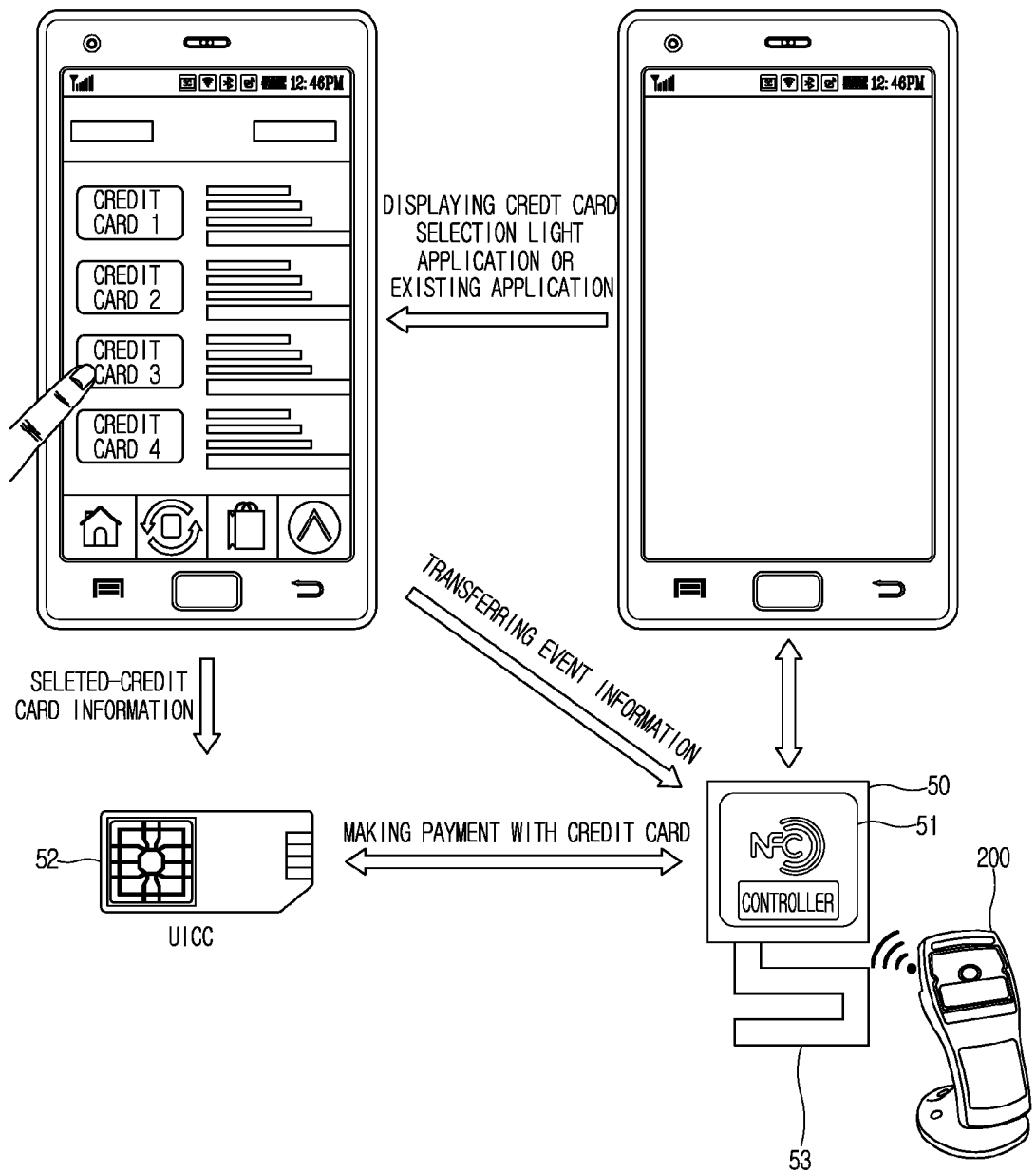
FIG. 6 is a diagram illustrating an example in which, after checking a power source state through the light application for checking the power source state, a credit card payment application is displayed.

FIG. 6 is a diagram illustrating an example in which, after checking the power source state through the light application for checking the power source state, the credit card payment application is displayed.

As illustrated in FIG. 6, if the payment request signal is received, the controller 51 checks the amount of available battery power, and thus whether the amount of available battery power is the predetermined threshold value (for example, 10 mA) or above. If, as a result of the checking, the amount of available battery power is smaller than the predetermined threshold value (for example, 10 mA), the controller 51 performs the payment by using the default credit card stored in the UICC 52 in the same manner that it did previously. If the amount of available battery power is the predetermined threshold value (for example, 10 mA) or above, the controller 51 executes the light application for checking the power source state, which is based on the light operating system (for example, Linux), through the application processor (AP) within the tunnel in order to check the power source state of the mobile terminal 100.

If, as a result of the checking, the mobile terminal 100 is in the power off state, the controller 51 causes the light application for checking the power source state to trigger the execution of the light application for selecting the credit card. If the mobile terminal 100 is in the power on state, the controller 51 ends the execution of the light application for checking the power source state and displays the existing mobile wallet application on the display unit 151. The subsequent operation in which the user selects the payment credit card from the light application or the mobile wallet application and makes the payment is illustrated in FIG. 4 and FIG. 5, and thus the description thereof is omitted.

Figure 7:
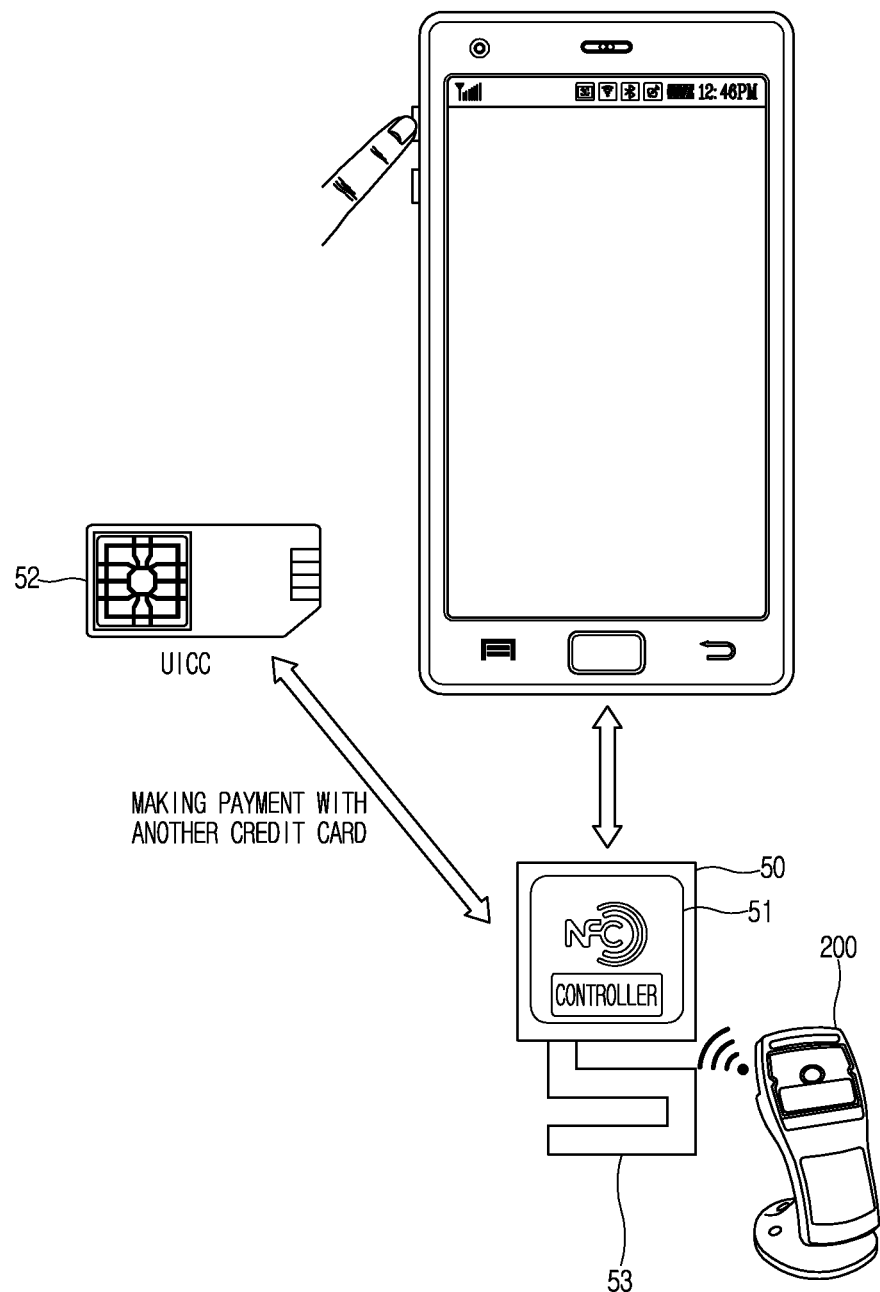
FIG. 7 is a diagram illustrating an example in which the payment is performed by using an H/W key in the power off state.

FIG. 7 is a diagram illustrating an example in which the payment is performed by using an H/W key in the power off state.

As illustrated in FIG. 7, if the user tries to make the payment while pushing down the H/W key (for example, turning up the volume level), the controller 51 within the NFC chip 50 does not execute the light application, but performs the payment with the default credit card stored in the UISS 52.

According to the present invention, in this credit card payment method, the light application is not always displayed at the time of the NFC payment in the power on state. That is, according to the present invention, if the NFC credit card payment is performed in the power off state, the payment is performed with the default credit card payment, depending on the user setting, the light application is displayed, or the light application and the receipt are displayed.

This method is applied to a case where the credit card payment fails, as well.

Figure 8:
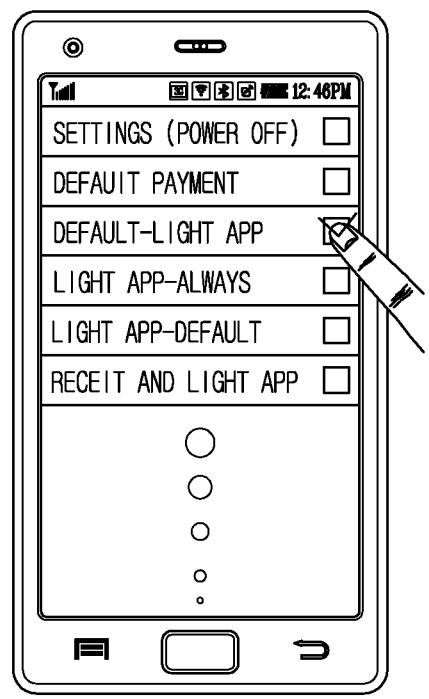
FIG. 8 is a diagram illustrating one example of a setting menu from which a user makes a selection at the time of the NFC payment in a low battery state.

FIG. 8 is a diagram illustrating one example of a setting menu from which the user makes a selection at the time of the NFC payment in the low battery state.

As illustrated in FIG. 8, the setting menu for the credit card payment at the power off state is for providing the setting with respect to the selection of the credit card at the time of the first payment and the selection of the credit card in the event of the first payment failure. The payment setting menu includes at least one item or more.

If an item "DEFAULT PAYMENT" is selected from the payment setting menu, the controller 51 performs the payment with the default credit card when the NFC payment is performed in the power off state. If an item "LIGHT APP-ALWAYS" is selected, the controller 51 always displays the light application in such a manner that the user can change the default credit card, when the NFC payment is performed in the power off state. Then, if an item "DEFAULT-LIGHT APP" is selected from the payment setting menu, the controller 51 displays the light application in such a manner that the user can select another payment credit card, when the default credit card payment fails. If an item "LIGHT APP-DEFAULT" is selected, the controller 51 performs the payment with the default credit card when the payment with the credit card selected from the light application fails. In addition, if an item "RECEIPT & LIGHT APP" is selected, the controller 51 displays the light application, and displays the light application, along with the receipt, when the payment succeeds.

The payment setting menu illustrated in FIG. 8 is one example, and is not limited to the one example. The setting may be provided to prioritize the credit cards selected from the light application, or the credit card with which the payment is performed when the default credit card fails, whenever necessary. In addition, the payment setting menu illustrated in FIG. 8 is applied in the power on state, as well.

Figure 9:
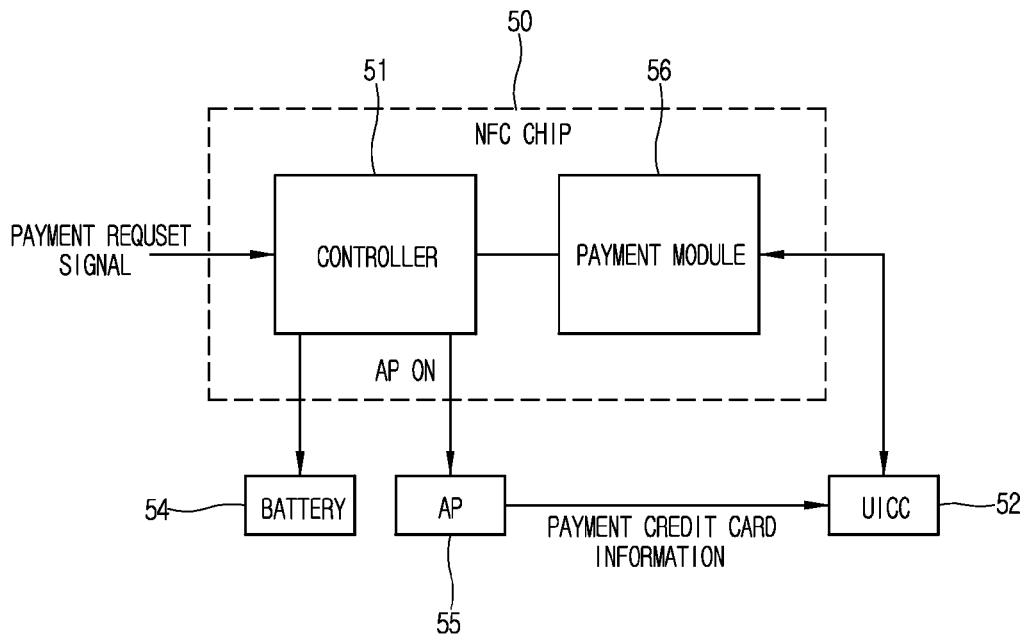
FIG. 9 is a schematic circuit diagram for performing the NFC payment according to the present invention.

FIG. 9 is a schematic circuit diagram for performing the NFC payment according to the present invention.

As illustrated in FIG. 9, the NFC chip 50 includes the controller 51 and a payment module 56. The controller 51 is supplied with standby current within the NFC chip and maintains an initiated state, and if the payment request signal is received in the power off state, the controller 51 performs a function of outputting an ON signal (AP ON) and thus operating (waking) an application processor 55. In particular, the controller 51 has a function of checking the power source state of the mobile terminal 100 and a function of checking the amount of available battery power. The universal IC card (UICC) 52 is a multi-functional smart credit card through which to provide subscriber authentication for a safe mobile network connection over the Internet and various supplementary services for communication and finance and stores setting information on the payment credit card, and stores information on the payment credit card setting.

The application processor 55 is the light operating system (for example, the embedded Linux) that is present within the tunnel. If the ON signal (AP ON) is input, the application processor 55 executes the light application (LA) according to the present invention, and provides the UICC 52 with the information on the payment credit card selected by the user from the light application (LA). The payment module 56 performs the credit card payment in cooperation with the POS terminal 200 by using the information on the payment credit card stored in the UICC 52, under the control of the controller 51.

Figure 10:
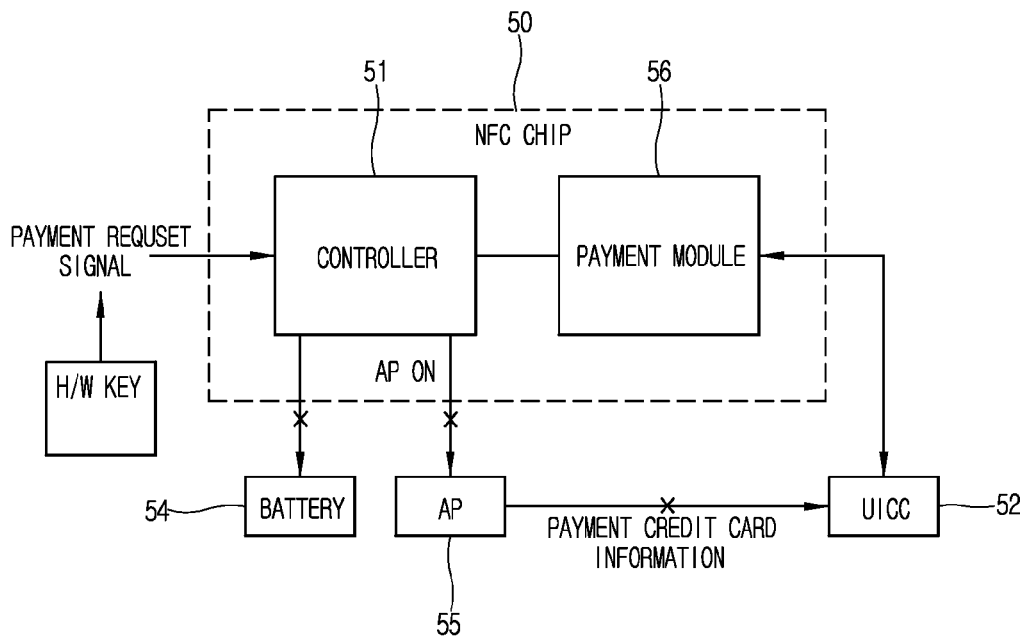
FIG. 10 is a circuit diagram illustrating how constituents works when a payment request is made through the use of an H/W key in the circuit diagram in FIG. 9.

FIG. 10 is a circuit diagram illustrating how constituents work when the payment request is made through the use of the H/W key.

Referring to FIG. 10, the payment request signal is generated through the use of the H/W key installed in the mobile terminal 100. If the payment request signal is generated through the use of the H/W key, since the controller 51 does not perform the functions of checking the amount of available power of the battery 54 and operating the AP 55, the AP 55 does not provide the UICC 52 with new information on the payment credit card. Therefore, the control window 51 performs the control in such a manner that the payment module 56 performs the payment with the default credit card stored in the UICC 52.

Figure 11:
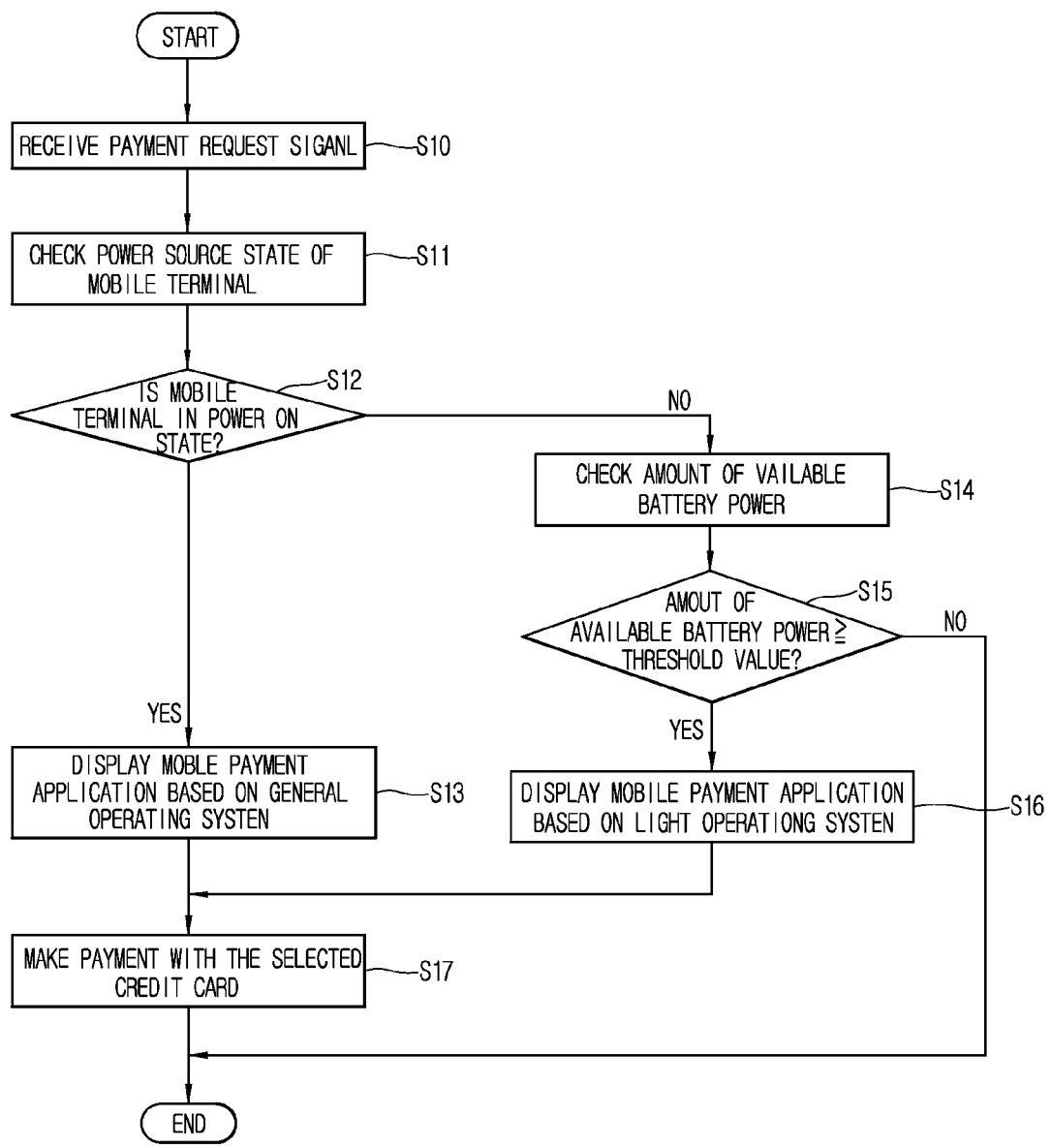
FIG. 11 is a flowchart illustrating a method of performing the NFC payment using the mobile terminal according to an embodiment of the present invention.

FIG. 11 is a flowchart illustrating a method of performing the NFC payment using the mobile terminal 100 according to an embodiment of the present invention.

As illustrated in FIG. 11, if the user brings the mobile terminal 100 into close proximity (tag) with the POS terminal 200 in the low battery state, the Bluetooth signal is input from the POS terminal 200 to the controller 51 of the NFC chip 50 in the mobile terminal 100.

The Bluetooth signal functions as the payment request signal. Since the controller 51 generates the AP ON signal that is transmitted to the AP 55, the Bluetooth signal, the payment request signal and the AP ON signal may be one and the same signal. In this case, the controller 51 performs a routing function.

When the payment request signal is received in this manner (S10), the controller 51 checks the power source state of the mobile terminal 100 (S11 and S12). If, as a result of the checking, the mobile terminal 100 is in the power on state, the controller 51 displays the OS-based mobile payment application in the same manner as it did previously (S13). If the user input does not take place during a predetermined period of time, the OS-based mobile payment application automatically disappears.

In contrast, if the mobile terminal 100 is in the power off state, the controller 51 does not perform the payment with the default credit card stored in the UICC 52, and determines whether to display the light application base on the light operating system (for example, Linux), depending on the amount of available power of the battery 54. That is, if the mobile terminal 100 is in the power off state, the controller 51 checks the amount of available power of the battery 54 (S14) and checks whether the checked amount of available power is the predetermined threshold value (for example, 10 mA) or above (S15). The threshold value is a minimum amount of the battery power necessary for one NFC payment.

If, as a result of the checking, the amount of available power of the battery 54 is smaller than the threshold value (for example, 10 mA), the controller 51 ends the entire credit card payment processing. If the amount of available power of the battery 54 is the threshold value (for example, 10 mA) or above, the controller 51 displays the mobile payment application based on the light operating system (for example, Linux), that is, the light application, on the display unit 51 (S16).

Therefore, the user selects the payment credit card that he/she wants to use, from the mobile payment application displayed on the display unit 151, which is executed on the general operating system or on the light operating system (for example, the embedded Linux), and the payment module 56 of the NFC chip 50 performs the NFC payment with the payment credit card selected by the user (S17).

An embodiment illustrated in FIG. 11 is the most basic NFC payment method according to the present invention, and corresponds to the case where the payment credit card is set to the "LIGHT APP-ALWAYS" in FIG. 8.

Figure 12:
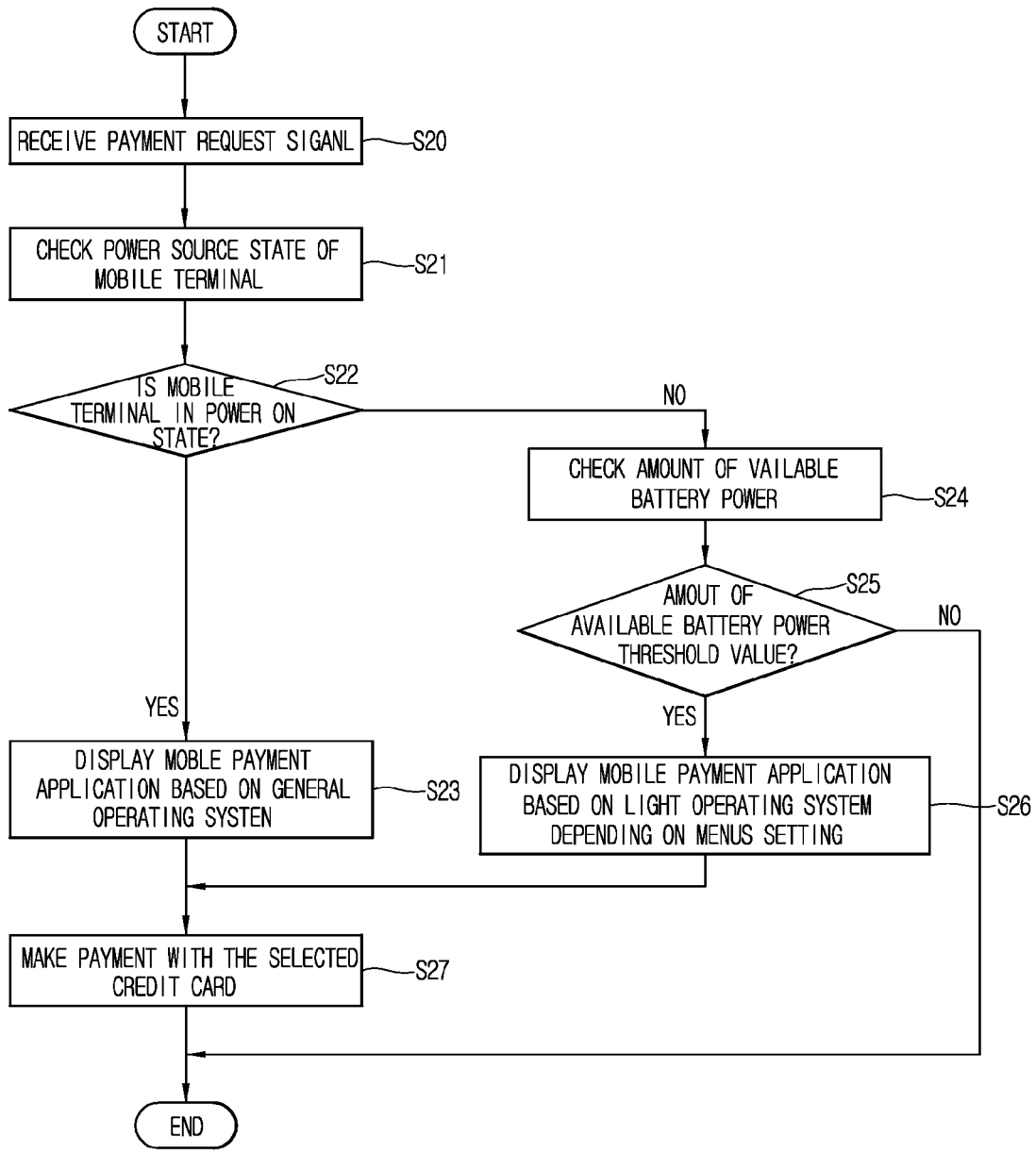
FIG. 12 is a flowchart illustrating a method of performing the NFC payment using the mobile terminal according to another embodiment of the present invention.

FIG. 12 is a flowchart illustrating a method of performing the NFC payment using the mobile terminal 100 according to another embodiment of the present invention. The embodiment illustrated in FIG. 12 is a modification to the basic embodiment illustrated in FIG. 11. According to the embodiment, if the amount of available battery power in the power off state is the threshold value or above, the mobile payment application based on the light operating system (for example, Linux) is not unconditionally displayed and is selectively displayed referring to the user payment setting.

Therefore, the steps other than Step S26 are the same as in FIG. 11, except for reference numerals. Step 26 provides option items for the next credit card payment when the first credit card payment fails. That is, if, as a result of the checking, the amount of available power of a battery 190 is the threshold value or above, referring to the payment setting stored in the UICC 52, the payment is performed with the default credit card or with the credit card selected from the mobile payment application based on the light operating system, depending on the payment setting.

As one example, if the payment credit card is set to "DEFAULT-LIGHT APP," the controller 51 performs the first credit card payment with the default credit card. If the corresponding credit card payment fails, the controller 51 performs the second credit card payment with the credit card selected from the mobile payment application based on the light operating system. In addition, if the credit card payment is set to "LIGHT APP-DEFAULT," the controller 51 performs the first credit card payment with the card selected from the mobile payment application based on the light operating system. If the corresponding credit card payment fails, the controller 51 performs the next payment with the default credit card.

Therefore, according to the embodiment illustrated in FIG. 12, there is provided an advantage that the number of times that the user selects the credit card can be reduced more than when the payment credit card is selected from the mobile payment application based on the light operating system that is displayed at all times, according to the embodiment.

Figure 13:
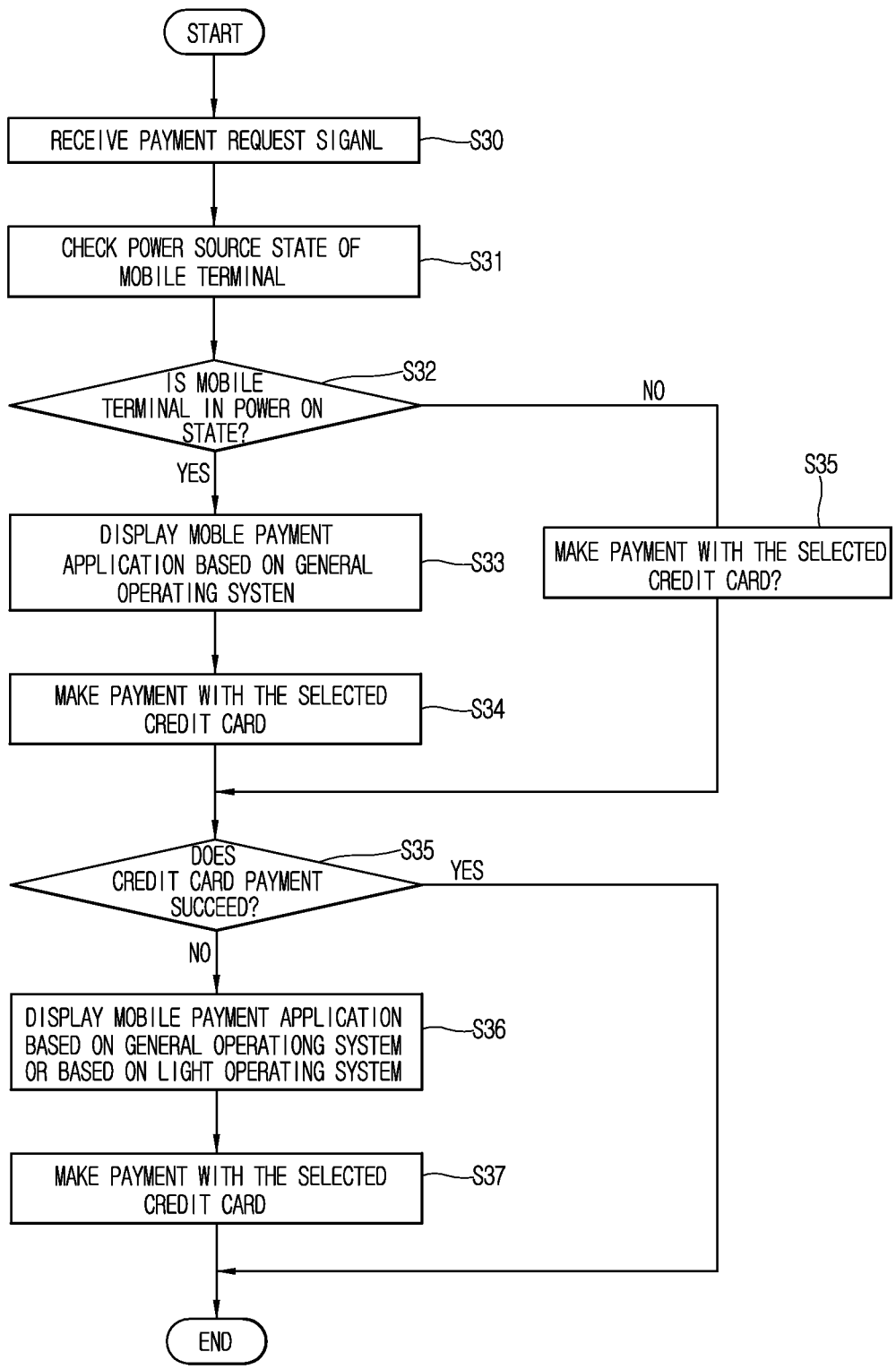
FIG. 13 is a flowchart illustrating an embodiment in which the next payment credit card is selected according to the power on/off state when the first credit card payment fails.

FIG. 13 is a flowchart illustrating an embodiment in which the next payment credit card is selected according to the power on/off state when the first credit card payment fails. A feature of the present embodiment is that the user credit card setting is applied only in the power off state.

Referring to FIG. 13, if the Bluetooth signal, that is, the payment request signal is received from the POS terminal 200 (S30), the controller 51 checks the power source state of the mobile terminal 100 (S31 and S32). If, as a result of the checking, the mobile terminal 100 is in the power on state, the controller 51 displays the mobile payment application based on the general operating system in order for the user to select the first payment credit card (S33).

In contrast, if the mobile terminal is in the power off state, the controller 51 checks the amount of available power of the battery 54 and checks whether the checked amount of available power is the predetermined threshold value (for example, 10 mA) or above. If, as a result of the checking, the amount of available power of the battery 54 is smaller than the threshold value (for example, 10 mA), the controller 51 ends the entire credit card payment processing. If the amount of available power of the battery 190 is the predetermined threshold value (for example, 10 mA) or above, the controller 51 checks the first payment credit card and the next payment credit card referring to the payment setting. In this case, a case where the payment credit card is set to "DEFAULT-LIGHT APP" is described as an example, for convenience in description.

Therefore, if the mobile terminal 100 is in the power on state, the first payment is performed with the credit card selected from the mobile payment application based on the general operating system, and if the mobile terminal 100 is in the power off state, the first payment is performed with the default credit card (S34). Each of the credit card payments is performed between the POS terminal 200 and the external POS server (not illustrated), a result of the payment is input back to the controller 51 of the NFC chip 50 in the mobile terminal 100.

The controller 51 checks whether the credit card payment succeeds or fails based on the result of the payment (S35). Then, if it is determined that the credit card payment succeeds, the controller 51 completes the entire payment operation. In contrast, if the payment with the first payment credit card fails, when the mobile terminal 100 is in the power on state, the controller 51 again displays the mobile payment application based on the general operating system in such a manner that another credit card can be selected. When the mobile terminal is in the power off state, the controller 51 displays the mobile payment application based on the light operating system (for example, Linux) (S36). Therefore, the controller 51 again performs the payment with the credit card selected from the mobile payment application based on the general operating system or based on the light operating system (for example, Linux) (S37).

Figure 14:
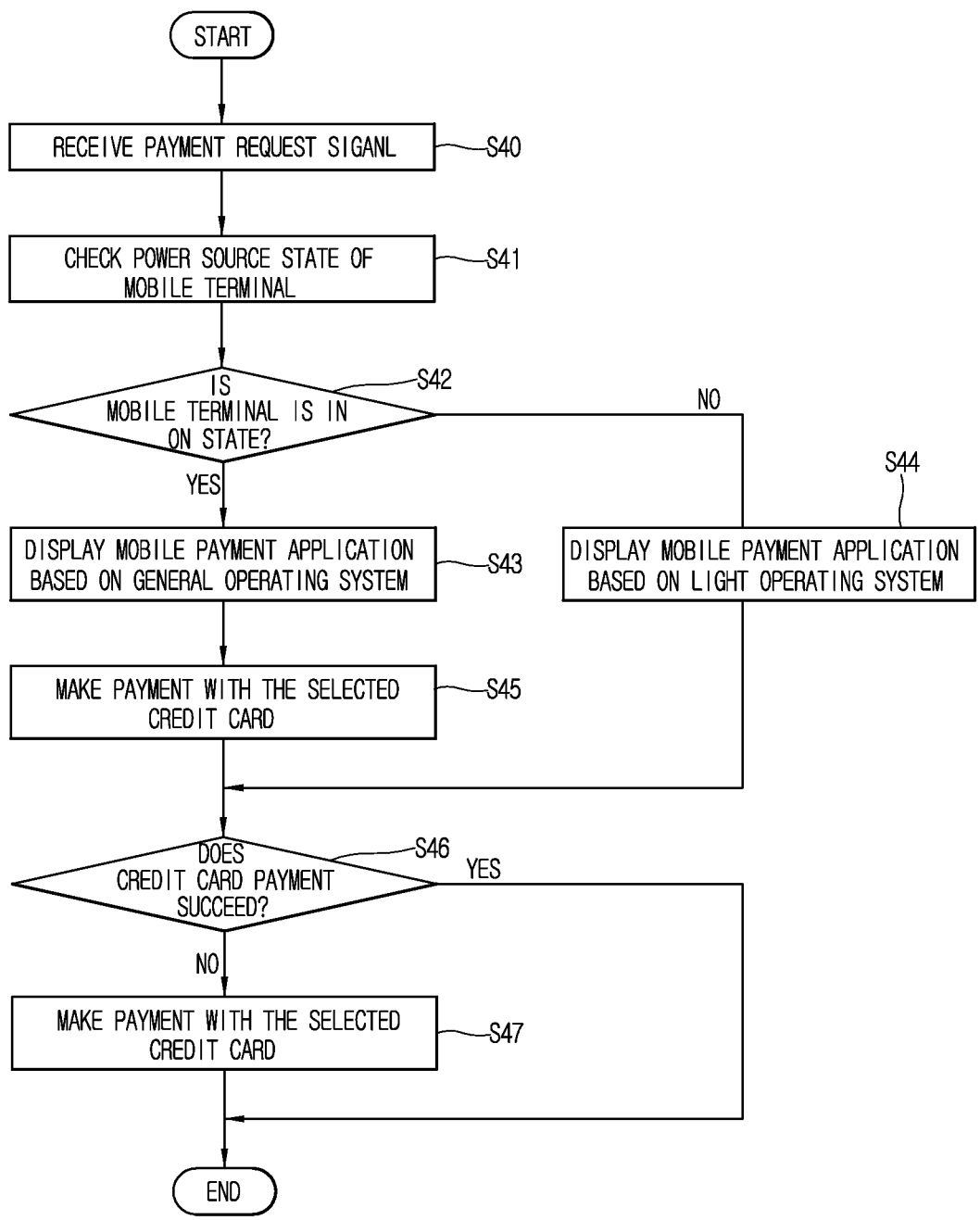
FIG. 14 is a flowchart illustrating another embodiment in which the next payment credit card is selected according to the power on/off state when the first credit card payment fails.

FIG. 14 is a flowchart illustrating another embodiment in which the next payment credit card is selected according to the power on/off state when the first credit card payment fails. A feature of the present embodiment is that the user credit card setting is applied not only in the power off state, but also in the power off state. Referring to FIG. 8, the payment credit card setting is described as being applied not only in the power on state but also in the power off state. Therefore, the user credit card setting can be applied in the power on state as well.

As illustrated in FIG. 14, if it is determined that the mobile terminal is in the power on state or in the power off state, when receiving the payment signal (S40 to S42), the controller 51 can display, for example, the mobile payment application based on the general operating system, and the mobile payment application based on the light operating system (for example, Linux) with respect to all of the two types, the power on state and the power off state, respectively, referring to the payment credit card setting (S43 and S44).

The user selects the payment credit card that he/she wants to use, from the mobile payment application based on the general operating system or based on the light operating system (for example, Linux), and the controller 51 performs the payment with the credit card selected by the user (S45)

If the result of performing the payment is received from the POS terminal 200, the controller 51 checks whether the credit card payment succeeds or fails (S35). Then, if it is determined that the credit card payment succeeds, the controller 51 completes the entire payment operation. In contrast, if the payment with the first payment credit card fails, the controller 51 performs the payment with the default credit card both in the power on state and in the power off state.

In addition, according to the present invention, even though the user cancels the payment amount in the power off state, the mobile payment application based on the light operating system (for example, Linux) can be provided in order for him/her to select again the credit card and make the payment.

As described above, according to the present invention, one effect is that even though an amount of charge money on the existing default credit card is all spent or an error occurs in the default credit card, the credit card payment is conveniently performed by providing a function of changing the default credit card at the time of the NFC payment in the low battery state.

According to the present invention, there is provided another effect that in the low battery state where the mobile terminal is powered off, the NFC payment is effectively performed by providing the mobile payment application based on the light operating system (for example, Linux) that is small in power consumption and is fast in speed.

According to the present invention, there is provided a further effect that in the low battery state where the mobile terminal is powered off, when the payment is made or when the payment fails, the payment is effectively performed with the various payment credit cards by providing the mobile payment application based on the light operating system and the option items for the selection of the payment credit card.

In addition, according to one embodiment of the present invention, the method described above may be realized by being stored as processor-readable codes in a program-stored medium. The computer-readable medium includes all types of recording devices that stores data that is readable by computer systems. A ROM, a RAM, a CD-ROM, a magnetic tape, a floppy disk, an optical data storage device and the like are examples of the computer-readable medium, and the computer-readable medium may be realized in the form of a carrier wave (for example, a transmission over the Internet). In addition, the computer may include a controller of the mobile terminal.

The mobile terminal and the method of performing the NFC payment using the mobile terminal according to the embodiment are not applied restrictedly in terms of configuration and manner, but all of or some of the embodiments may be selectively combined with each other to create various modifications to the embodiments.

The foregoing embodiments and advantages are merely exemplary and are not to be considered as limiting the present disclosure. The present teachings can be readily applied to other types of apparatuses. This description is intended to be illustrative, and not to limit the scope of the claims. Many alternatives, modifications, and variations will be apparent to those skilled in the art. The features, structures, methods, and other characteristics of the exemplary embodiments described herein may be combined in various ways to obtain additional and/or alternative exemplary embodiments.

As the present features may be embodied in several forms without departing from the characteristics thereof, it should also be understood that the above-described embodiments are not limited by any of the details of the foregoing description, unless otherwise specified, but rather should be considered broadly within its scope as defined in the appended claims, and therefore all changes and modifications that fall within the metes and bounds of the claims, or equivalents of such metes and bounds are therefore intended to be embraced by the appended claims.

What is claimed is:

1. A method of performing near field communication (NFC) payment using a mobile terminal having a display and an NFC chip, comprising:
   checking, by the NFC chip, a power state of the mobile terminal when a payment request signal is received from a point of sales (POS) terminal, wherein the power state of the mobile terminal is either a power on state of the mobile terminal or a power off state of the mobile terminal;
   displaying, on the display of the mobile terminal, a first payment application that is executed using a first operating system when the checking identifies that the mobile terminal is in the power on state;
   displaying, on the display of the mobile terminal, a second payment application that is executed using a second operating system when the mobile terminal is in the power off state; and
   transmitting, by the NFC chip, the NFC payment to the POS terminal with a credit card selected from either the first payment application or the second payment application,
   wherein the second operating system is smaller in power consumption and does not have a booting process, or has a shorter booting process that is faster in a booting speed, than the first operating system.

2. The method of claim 1, wherein the power off state is a low battery state where only specific functions of the mobile terminal can be performed, and
   wherein the second payment application that is using the second operating system is displayed only if remaining battery power is above a threshold value.

3. The method of claim 1, further comprising:
   transmitting the NFC payment with a default credit card if the NFC payment with the selected credit card fails.

4. A method of performing near field communication (NFC) payment using a mobile terminal having a display and an NFC chip, comprising:
   checking, by the NFC chip, a power source state of the mobile terminal when credit card payment is requested from a point of sales (POS) terminal, wherein the power source state of the mobile terminal is either a power on state of the mobile terminal or a power off state of the mobile terminal;
   displaying, on the display of the mobile terminal, a first payment application that is executed using a first operating system when the checking identifies that the mobile terminal is in the power on state;
   selectively displaying, on the display of the mobile terminal, a second payment application among a plurality of payment applications that is executed using a second operating system according to a preset payment setting when the checking identifies that the mobile terminal is in the power off state; and
   transmitting, by the NFC chip, the NFC payment to the POS terminal with a credit card selected from either the first payment application or the second payment application,
   wherein the second operating system is smaller in power consumption and does not have a booting process, or has a shorter booting process that is faster in a booting speed, than the first operating system.

5. The method of claim 4, wherein the power off state is a low battery state where only specific functions of the mobile terminal can be performed, and
   wherein the payment setting includes a credit card setting for the NFC payment and another same payment.

6. The method of claim 4, wherein the selectively displaying the second payment application comprises:
   displaying the second payment application using the second operating system, for selection of the credit card when the preset payment setting is application payment, and
   displaying a default credit card when the preset payment setting is default payment.

7. The method of claim 4, further comprising:
   transmitting another same payment according to the preset payment setting when the NFC payment fails.

8. The method of claim 7, wherein the another same payment is transmitted with the credit card selected from the second payment application if the NFC payment is performed with a default credit card.

9. The method of claim 7, wherein, the another same payment is transmitted with a different credit card selected from the second payment application or a default credit card if the NFC payment is performed with the credit card selected from the second payment application.

10. A mobile terminal, comprising:
    a display;
    a universal IC card (UICC) configured to store payment credit card information;
    a near field communication (NFC) chip configured to receive a payment request signal from a point of sales (POS) terminal; and
    a controller configured to:
       cause the display to display a first payment application that is executed using a first operating system when the mobile terminal is in a power on state;
       cause the display to display a second payment application that is executed using a second operating system when the mobile terminal is in the power off state, wherein the second operating system is smaller in power consumption and does not have a booting process, or has a shorter booting process that is faster in a booting speed, than the first operating system; and
    wherein the NFC chip is further configured to:
       cause the NFC chip to transmit a NFC payment to the POS terminal with a credit card selected from either the first payment application or the second payment application.

11. The mobile terminal of claim 10, wherein the power off state is a low battery state where only specific functions of the mobile terminal can be performed, and
    wherein the display displays the second payment application that is executed on the second operating system if remaining battery power is above a threshold value.

12. The mobile terminal of claim 10, wherein the NFC chip transmits the another same payment with a default credit card stored in the universal IC (UICC) if the NFC payment with the selected credit card fails.

13. A mobile terminal comprising:
a display;
a universal IC card (UICC) configured to store payment credit card information; and
a near field communication (NFC) chip configured to:
   check a power state of the mobile terminal when a payment request signal is received from a point of sales (POS) terminal, wherein the power state is either a power on state or a power off state;
a controller configured to:
   cause the display to display a first payment application that is executed using a first operating system when the mobile terminal is in the power on state;
   cause the display to display a second payment application that is executed using a second operating system when the mobile terminal is in the power off state, wherein the second operating system is smaller in power consumption and does not have a booting process, or has a shorter booting process that is faster in a booting speed, than the first operating system; and
wherein the NFC chip is further configured to:
   cause the NFC chip to transmit a NFC payment to the POS terminal with a credit card selected from either the first payment application or the second payment application.

14. The mobile terminal of claim 13, wherein the display displays the first payment application based on a current operating system when the payment with the credit card is transmitted in the power on state of the mobile terminal.

15. The mobile terminal of claim 13, wherein the power off state is a low battery state where only specific functions of the mobile terminal can be performed, and
   wherein the preset payment setting includes a credit card setting for NFC payment and another same payment.

16. The mobile terminal of claim 13, wherein the display displays the second payment application based on the second operating system, for selection of a credit card when the preset payment setting is application payment, and transmits the payment with a default credit card when the preset payment setting is default payment.

17. The mobile terminal of claim 15, wherein the NFC chip transmits another same payment according to the preset payment setting when the NFC payment fails.

18. The mobile terminal of claim 17, wherein the NFC chip transmits the another same payment with a credit card selected from the second payment application when the NFC payment is made with a default credit card, and transmits the another same payment with a different credit card selected from the same application or a default credit card when the NFC payment is made with a credit card selected from the second payment application.

* * * * *